(12) United States Patent
Nagasaka

(10) Patent No.: US 10,838,741 B2
(45) Date of Patent: Nov. 17, 2020

(54) INFORMATION PROCESSING DEVICE, INFORMATION PROCESSING METHOD, AND PROGRAM

(71) Applicant: SONY CORPORATION, Tokyo (JP)

(72) Inventor: Hideo Nagasaka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 175 days.

(21) Appl. No.: 15/576,599

(22) PCT Filed: Jan. 24, 2017

(86) PCT No.: PCT/JP2017/002215
§ 371 (c)(1),
(2) Date: Nov. 22, 2017

(87) PCT Pub. No.: WO2017/187677
PCT Pub. Date: Nov. 2, 2017

(65) Prior Publication Data
US 2018/0165099 A1    Jun. 14, 2018

(30) Foreign Application Priority Data

Apr. 26, 2016 (JP) ................................ 2016-088022

(51) Int. Cl.
*G06F 9/445* (2018.01)
*G06F 3/16* (2006.01)
(Continued)

(52) U.S. Cl.
CPC ............. *G06F 9/445* (2013.01); *G06F 3/167* (2013.01); *G06F 13/00* (2013.01); *H04L 12/282* (2013.01); *H04L 12/2809* (2013.01)

(58) Field of Classification Search
None
See application file for complete search history.

(56) References Cited

U.S. PATENT DOCUMENTS 8,806,483 B2 *  8/2014  Anderson, III ....... G06F 9/5077
                                                         718/1
10,416,625 B2 *  9/2019  Marti .................... G05B 15/02
(Continued)

OTHER PUBLICATIONS

Oct. 29, 2019, European Search Report issued for related EP Application No. 17788967.2.
(Continued)

*Primary Examiner* — Umut Onat
(74) *Attorney, Agent, or Firm* — Paratus Law Group, PLLC

(57) ABSTRACT

There is provided an information processing device capable of proposing automation of execution of programs at a timing convenient for a user, the information processing device including: an information acquisition unit configured to acquire input information of a user; and a proposal control unit configured to propose automation of control related to the input information at an acquisition timing of the input information. The proposal control unit is configured to propose automation of control of execution of a second program obtained by performing, on a first program, at least one of addition of a first relevant element related to an input element included in the first program recognized from the input information, and replacement of the input element with a second relevant element related to the input element.

22 Claims, 32 Drawing Sheets

(51) Int. Cl.
*H04L 12/28* (2006.01)
*G06F 13/00* (2006.01)

(56) References Cited

U.S. PATENT DOCUMENTS

| | | | |
|---|---|---|---|
| 2009/0183178 | A1 | 7/2009 | Imai et al. |
| 2011/0131529 | A1* | 6/2011 | Doi ................... G06F 9/445 715/810 |
| 2013/0185081 | A1 | 7/2013 | Cheyer et al. |
| 2015/0161708 | A1* | 6/2015 | Jammalamadaka ... G06Q 30/02 705/26.62 |
| 2015/0382047 | A1* | 12/2015 | Van Os ................... G06F 16/73 725/38 |
| 2017/0097743 | A1* | 4/2017 | Hameed ................ G06F 3/0482 |

OTHER PUBLICATIONS

Jeon et al., An Intelligent Dialogue Agent for the IoT Home, AAAI Workshop: Artificial Intelligence Applied to Assistive Technologies and Smart Environments, 2016, pp. 35-40, vol. WS-16-01, AAAI Press.

\* cited by examiner

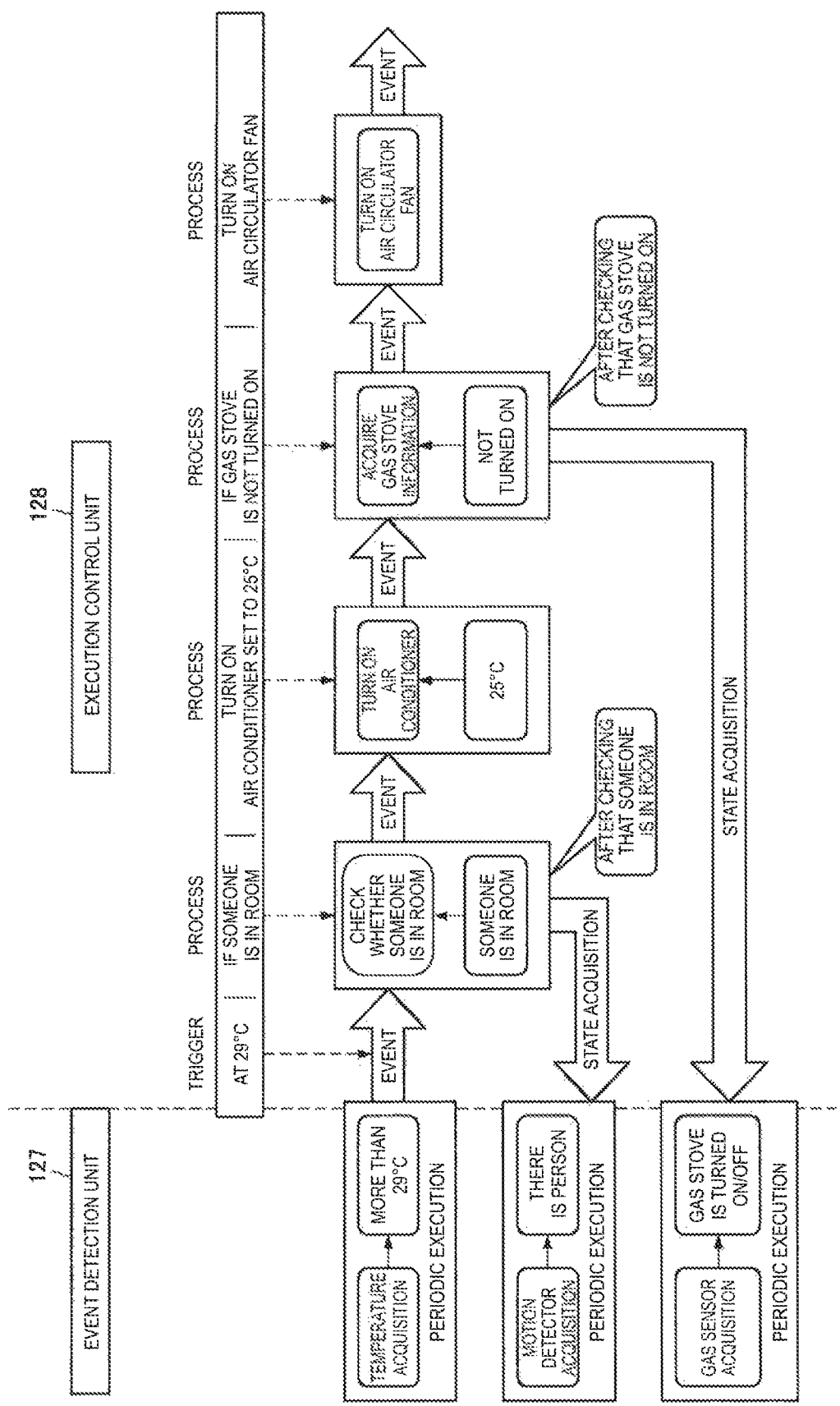

FIG. 5

| | TIMING (SOME SORT OF USER BEHAVIOR) | ASSOCIATIVE KEY (WORK WITH WHICH PART OF USER BEHAVIOR?) | CONTENT OF PROPOSAL OF AUTOMATION OF PROCESS (PROPOSAL OF AUTOMATION RELATED TO USER BEHAVIOR) |
|---|---|---|---|
| ① | PROCESS REQUEST FROM U TO A (A VICARIOUSLY EXECUTES PROCESS) | | AUTOMATE CONTENT PROCESSED BY ADDING CONDITION |
| ② | | PROCESS (APP, FUNCTION, ETC.) | ADD PROCESS TO WORK WITH WHEN EXECUTING PROCESS (OPERATE AUTOMATICALLY) |
| ③ | | OBJECT(SUCH AS NAME OF POP STAR) OF PROCESS | PROPOSE AUTOMATION OF PROCESS USING OBJECT |
| ④ | AUTOMATION SETTING FROM U TO A (A WILL VICARIOUSLY EXECUTE PROCESS IN FUTURE) | | ADD ADDITIONAL CONDITION |
| ⑤ | | PROCESS (APP, FUNCTION, ETC.) | ADD PROCESS TO WORK WITH WHEN EXECUTING PROCESS (OPERATE AUTOMATICALLY) |
| ⑥ | | OBJECT(SUCH AS NAME OF POP STAR) OF PROCESS | PROPOSE AUTOMATION OF PROCESS USING OBJECT |
| ⑦ | U PERFORMS PROCESS BY HIMSELF/HERSELF (OBSERVED BY A) | | AUTOMATE CONTENT PROCESSED BY ADDING CONDITION |
| ⑧ | | PROCESS (APP, FUNCTION, ETC.) | ADD PROCESS TO WORK WITH WHEN EXECUTING PROCESS (OPERATE AUTOMATICALLY) |
| ⑨ | | OBJECT(SUCH AS NAME OF POP STAR) OF PROCESS | PROPOSE AUTOMATION OF PROCESS USING OBJECT |
| ⑩ | CONVERSATION BETWEEN A AND USER (AT TIME OF QUESTION OR CONVERSATION) | | AUTOMATE CONTENT PROCESSED BY ADDING CONDITION |
| ⑪ | | PROCESS (APP, FUNCTION, ETC.) | ADD PROCESS TO WORK WITH WHEN EXECUTING PROCESS (OPERATE AUTOMATICALLY) |
| ⑫ | | OBJECT(SUCH AS NAME OF POP STAR) OF PROCESS | PROPOSE AUTOMATION OF PROCESS USING OBJECT |

FIG. 6

| TIMING | ASSOCIATIVE KEY | CONTENT OF PROPOSAL |
|---|---|---|
| ① PROCESS REQUEST FROM U TO A (A VICARIOUSLY EXECUTES PROCESS) | PROCESS (APP, FUNCTION, ETC.) | AUTOMATE CONTENT PROCESSED BY ADDING CONDITION |

SPECIFIC EXAMPLE

- WHAT'S THE WEATHER LIKE? (U)
- TODAY'S WEATHER IS XXXXX
  (A: WEATHER INFORMATION ACQUISITION PROCESS + NOTIFICATION)   ⎫ AT ACQUISITION TIMING OF WEATHER INFORMATION

- MAY I TELL YOU "IF IT RAINS"?
  (A: WEATHER INFORMATION ACQUISITION + NOTIFICATION)   ⎫ PROPOSE AUTOMATION OF WEATHER INFORMATION ACQUISITION UNDER CONDITION OF "RAIN"
- YES, PLEASE (U)

SUBSEQUENTLY, WEATHER INFORMATION IS PERIODICALLY ACQUIRED. NOTIFICATION IS AUTOMATICALLY ISSUED IF IT WILL RAIN.

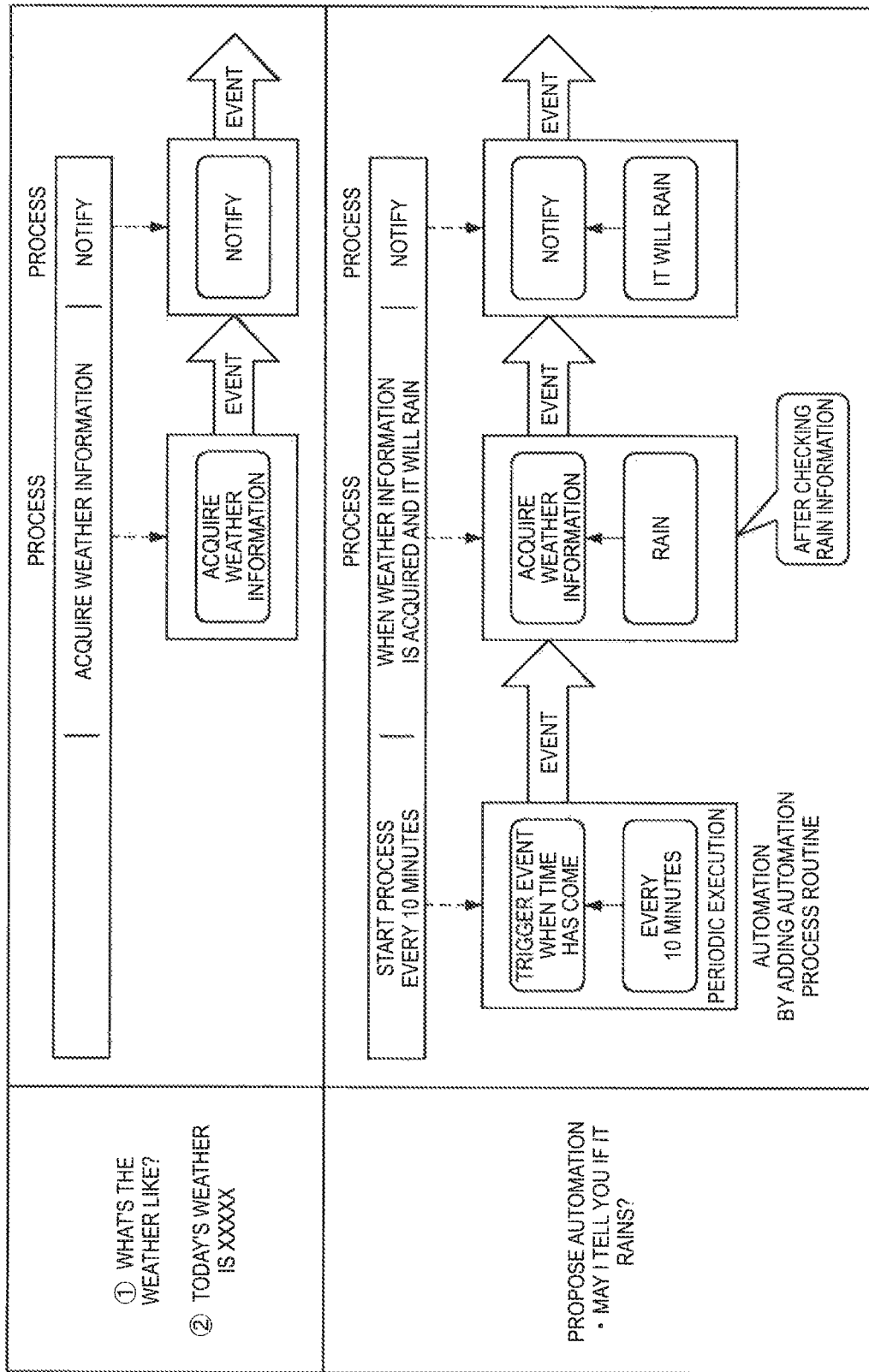

FIG. 8

| TIMING (SOME SORT OF USER BEHAVIOR) | ASSOCIATIVE KEY (WORK WITH WHICH PART OF USER BEHAVIOR?) PROCESS (APP, FUNCTION, ETC.) | CONTENT OF PROPOSAL OF AUTOMATION OF PROCESS (PROPOSAL OF AUTOMATION RELATED TO USER BEHAVIOR) |
|---|---|---|
| ② PROCESS REQUEST FROM U TO A (A VICARIOUSLY EXECUTES PROCESS) | | ADD PROCESS TO WORK WITH WHEN EXECUTING PROCESS (OPERATE AUTOMATICALLY) |

SPECIFIC EXAMPLE

- PLEASE TURN ON AIR CONDITIONER (U)
- OK (A: PROCESS OF TUNING ON AIR CONDITIONER IN PARALLEL) } ALTERNATE PROCESS OF AIR CONDITIONER PROCESS

- MAY I TURN ON AIR CIRCULATOR FAN WHEN AIR CONDITIONER IS TURNED ON? (A) } PROPOSE PROCESS WORKING WITH AIR CONDITIONER PROCESS
- YES, PLEASE (U)

SUBSEQUENTLY, AIR CIRCULATOR FAN TURNS ON (AUTOMATICALLY AND REGARDLESS OF USER OPERATION) WHEN AIR CONDITIONER IS TURNED ON

FIG. 12

| TIMING | ASSOCIATIVE KEY | CONTENT OF PROPOSAL |
|---|---|---|
| ④ AUTOMATION SETTING FROM U TO A (A WILL VICARIOUSLY EXECUTE PROCESS IN FUTURE) | PROCESS (APP, FUNCTION, ETC.) | ADD ADDITIONAL CONDITION |

SPECIFIC EXAMPLE

- PLEASE WAKE ME UP AT EIGHT EVERY MORNING (U: SET ALARM AT EIGHT) } WHEN ALARM IS SET
- BUT I WILL NOT WAKE YOU UP ON WEEKENDS (U: CONDITION IS CHANGED FROM EVERYDAY TO WEEKDAYS) } CHANGE ALARM CONDITION
- OK (A: AUTOMATION IS SET SINCE CONDITION IS SATISFIED)

SUBSEQUENTLY, ALARM AUTOMATICALLY RINGS AT EIGHT ON WEEKDAYS ONLY

FIG. 14

| TIMING (SOME SORT OF USER BEHAVIOR) | ASSOCIATIVE KEY (WORK WITH WHICH PART OF USER BEHAVIOR?) | CONTENT OF PROPOSAL OF AUTOMATION OF PROCESS (PROPOSAL OF AUTOMATION RELATED TO USER BEHAVIOR) |
|---|---|---|
| ⑤ AUTOMATION SETTING FROM U TO A (A WILL VICARIOUSLY EXECUTE PROCESS IN FUTURE) | PROCESS (APP, FUNCTION, ETC.) | ADD PROCESS TO WORK WITH WHEN EXECUTING PROCESS (OPERATE AUTOMATICALLY) |

SPECIFIC EXAMPLE

· PLEASE TURN ON AIR CONDITIONER AT EIGHT EVERY MORNING (U) ⎫
⎬ SET AUTOMATION OF AIR CONDITIONER
· MAY I TURN ON AIR CIRCULATOR FAN WHEN AIR CONDITIONER IS TURNED ON? (A) ⎫
· YES, PLEASE (U) ⎬ PROPOSE PROCESS WORKING WITH AIR CONDITIONER PROCESS

SUBSEQUENTLY, AIR CIRCULATOR FAN TURNS ON (AUTOMATICALLY AND REGARDLESS OF USER OPERATION) WHEN AIR CONDITIONER IS TURNED ON

FIG. 16

| | TIMING (SOME SORT OF USER BEHAVIOR) | ASSOCIATIVE KEY (WORK WITH WHICH PART OF USER BEHAVIOR?) | CONTENT OF PROPOSAL OF AUTOMATION OF PROCESS (PROPOSAL OF AUTOMATION RELATED TO USER BEHAVIOR) |
|---|---|---|---|
| ⑥ | AUTOMATION SETTING FROM U TO A (A WILL VICARIOUSLY EXECUTE PROCESS IN FUTURE) | OBJECT (SUCH AS NAME OF POP STAR) OF PROCESS | PROPOSE AUTOMATION OF PROCESS USING OBJECT |

- EXTRACT POP STAR USER LOVES AND OTHER INFORMATION INCLUDED IN AUTOMATION SETTINGS, AND PROPOSE COMBINATION OF APPS CAPABLE OF USING SUCH INFORMATION

- PLEASE TELL ME IF THERE IS VIDEO OF <u>ARTIST M1</u>.
  SUCH AS     SEARCH KEY           ⎫ SET AUTOMATION OF SEARCHING FOR VIDEO
  VIDEO-SHARING                    ⎭
  SERVICE

- MAY I TELL YOU IF THERE IS VIDEO RELATED TO ARTIST M1?  ⎫ PROPOSE COMBINATION OF PROCESSES USING KEYWORDS
  (①AUTOMATION OF REQUEST CONTENT)                        ⎬ IN SIMILAR WAY
- MAY I TELL YOU IF THERE IS PROGRAM OR NEWS RELATED TO ARTIST M1?  ⎭
- YES, PLEASE

SUBSEQUENTLY, PROGRAM AND NEWS ARE PERIODICALLY ACQUIRED.
NOTIFICATION IS AUTOMATICALLY ISSUED IF THERE IS PROGRAM OR NEWS RELATED TO ARTIST M1.

FIG. 18

| | TIMING | ASSOCIATIVE KEY<br>PROCESS<br>(APP, FUNCTION, ETC.) | CONTENT OF PROPOSAL |
|---|---|---|---|
| ⑦ | U PERFORMS PROCESS BY HIMSELF/HERSELF (OBSERVED BY A) | | AUTOMATE CONTENT PROCESSED BY ADDING CONDITION |

SPECIFIC EXAMPLE

- USER U HAS USED (STARTED OR FINISHED USING) WEATHER APP } AT ACQUISITION TIMING OF WEATHER INFORMATION

- MAY I TELL YOU "IF IT RAINS"?
 (A: WEATHER INFORMATION ACQUISITION + NOTIFICATION) } PROPOSE AUTOMATION OF WEATHER INFORMATION ACQUISITION UNDER CONDITION OF "RAIN"
- YES, PLEASE (U)

SUBSEQUENTLY, WEATHER INFORMATION IS PERIODICALLY ACQUIRED. NOTIFICATION IS AUTOMATICALLY ISSUED IF IT WILL RAIN.

FIG. 20

| TIMING (SOME SORT OF USER BEHAVIOR) | ASSOCIATIVE KEY (WORK WITH WHICH PART OF USER BEHAVIOR?) PROCESS (APP, FUNCTION, ETC.) | CONTENT OF PROPOSAL OF AUTOMATION OF PROCESS (PROPOSAL OF AUTOMATION RELATED TO USER BEHAVIOR) |
|---|---|---|
| ⑧ U PERFORMS PROCESS BY HIMSELF/HERSELF (OBSERVED BY A) | | ADD PROCESS TO WORK WITH WHEN EXECUTING PROCESS (OPERATE AUTOMATICALLY) |

SPECIFIC EXAMPLE

· TURN ON AIR CONDITIONER (U)

· MAY I TURN ON AIR CIRCULATOR FAN WHEN AIR CONDITIONER IS TURNED ON? (A) ⎫ PROPOSE PROCESS WORKING WITH AIR CONDITIONER PROCESS
· YES, PLEASE (U) ⎭

SUBSEQUENTLY, AIR CIRCULATOR FAN TURNS ON (AUTOMATICALLY AND REGARDLESS OF USER OPERATION) WHEN AIR CONDITIONER IS TURNED ON

FIG. 24

| | TIMING | ASSOCIATIVE KEY | CONTENT OF PROPOSAL |
|---|---|---|---|
| | | PROCESS (APP, FUNCTION, ETC.) | |
| ⑩ | CONVERSATION BETWEEN A AND USER (AT TIME OF QUESTION OR CONVERSATION) | } EXTRACT APPS THAT USER HAS OFTEN USED FROM USER LOGS, ETC. AND PROPOSE AUTOMATION | AUTOMATE CONTENT PROCESSED BY ADDING CONDITION |

SPECIFIC EXAMPLE

- I THINK YOU OFTEN USES AIR CONDITIONER AT EIGHT, SO MAY I TURN ON AIR CONDITIONER AT EIGHT EVERY MORNING?
- YES, PLEASE (U)

SUBSEQUENTLY, AT EIGHT, AIR CONDITIONER AUTOMATICALLY TURNS ON (AUTOMATICALLY AND REGARDLESS OF USER OPERATION) AND AIR CIRCULATOR FAN TURNS ON

FIG. 25

| TIMING (SOME SORT OF USER BEHAVIOR) | ASSOCIATIVE KEY (WORK WITH WHICH PART OF USER BEHAVIOR?) | CONTENT OF PROPOSAL OF AUTOMATION OF PROCESS (PROPOSAL OF AUTOMATION RELATED TO USER BEHAVIOR) |
|---|---|---|
| (11) CONVERSATION BETWEEN A AND USER (AT TIME OF QUESTION OR CONVERSATION) | PROCESS (APP, FUNCTION, ETC.) | ADD PROCESS TO WORK WITH WHEN EXECUTING PROCESS (OPERATE AUTOMATICALLY) |

SPECIFIC EXAMPLE

- I THINK YOU OFTEN USES AIR CONDITIONER TOGETHER WITH AIR CIRCULATOR FAN, SO MAY I TURN ON AIR CIRCULATOR FAN WHEN AIR CONDITIONER IS TURNED ON? } EXTRACT APPS THAT HAVE OFTEN BEEN COMBINED FROM USER LOGS, ETC.

- YES, PLEASE (U)

SUBSEQUENTLY, AIR CIRCULATOR FAN AUTOMATICALLY TURNS ON (AUTOMATICALLY AND REGARDLESS OF USER OPERATION) WHEN AIR CONDITIONER IS TURNED ON

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2017/002215 (filed on Jan. 24, 2017) under 35 U.S.C. § 371, which claims priority to Japanese Patent Application No. 2016-088022 (filed on Apr. 26, 2016), which are all hereby incorporated by reference in their entirety.

TECHNICAL FIELD

The present disclosure relates to an information processing device, an information processing method, and a program.

BACKGROUND ART

In recent years, various kinds of technologies have been disclosed with regard to technologies of recommending applications to users. For example, a technology of recommending another application to a user at a time of execution of an application is disclosed (see Patent Literature 1, for example). The another application corresponds to relevant information of the application. In addition, a technology of recommending a function or another application to a user is disclosed (see Patent Literature 2, for example). The function corresponds to a function currently being executed by an application.

In addition to the recommendation of applications to users, there are technologies of proposing automation of execution of the applications to the users.

CITATION LIST

Patent Literature

Patent Literature 1: JP 2010-157207A
Patent Literature 2: JP 2011-90391A

DISCLOSURE OF INVENTION

Technical Problem

However, it is desired to provide a technology capable of proposing automation of execution of programs at a timing convenient for a user.

Solution to Problem

According to the present disclosure, there is provided an information processing device including: an information acquisition unit configured to acquire input information of a user; and a proposal control unit configured to propose automation of control related to the input information at an acquisition timing of the input information. The proposal control unit is configured to propose automation of control of execution of a second program obtained by performing, on a first program, at least one of addition of a first relevant element related to an input element included in the first program recognized from the input information, and replacement of the input element with a second relevant element related to the input element.

According to the present disclosure, there is provided an information processing method including: acquiring input information of a user; and proposing, by a processor, automation of control related to the input information at an acquisition timing of the input information. The information processing method further includes proposing automation of control of execution of a second program obtained by performing, on a first program, at least one of addition of a first relevant element related to an input element included in the first program recognized from the input information, and replacement of the input element with a second relevant element related to the input element.

According to the present disclosure, there is provided a program causing a computer to function as an information processing device including: an information acquisition unit configured to acquire input information of a user; and a proposal control unit configured to propose automation of control related to the input information at an acquisition timing of the input information. The proposal control unit is configured to propose automation of control of execution of a second program obtained by performing, on a first program, at least one of addition of a first relevant element related to an input element included in the first program recognized from the input information, and replacement of the input element with a second relevant element related to the input element.

Advantageous Effects of Invention

As described above, the present disclosure provides the technology capable of proposing automation of execution of programs at a timing convenient for a user. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 4 is a diagram illustrating an image of automated execution of a second program.

FIG. 5 is a classification table of patterns of proposals of automation to a user.

FIG. 6 is a diagram illustrating a specific example of a first pattern.

FIG. 7 is a diagram illustrating an image of settings of automation with regard to the first pattern.

FIG. 8 is a diagram illustrating a specific example of a second pattern.

FIG. 12 is a diagram illustrating a specific example of a fourth pattern.

FIG. 14 is a diagram illustrating a specific example of a fifth pattern.

FIG. 16 is a diagram illustrating a specific example of a sixth pattern.

FIG. 18 is a diagram illustrating a specific example of a seventh pattern.

FIG. 20 is a diagram illustrating a specific example of an eighth pattern.

FIG. 24 is a diagram illustrating a specific example of a tenth pattern.

FIG. 25 is a diagram illustrating a specific example of an 11th pattern.

MODE(S) FOR CARRYING OUT THE INVENTION

Figure 1:
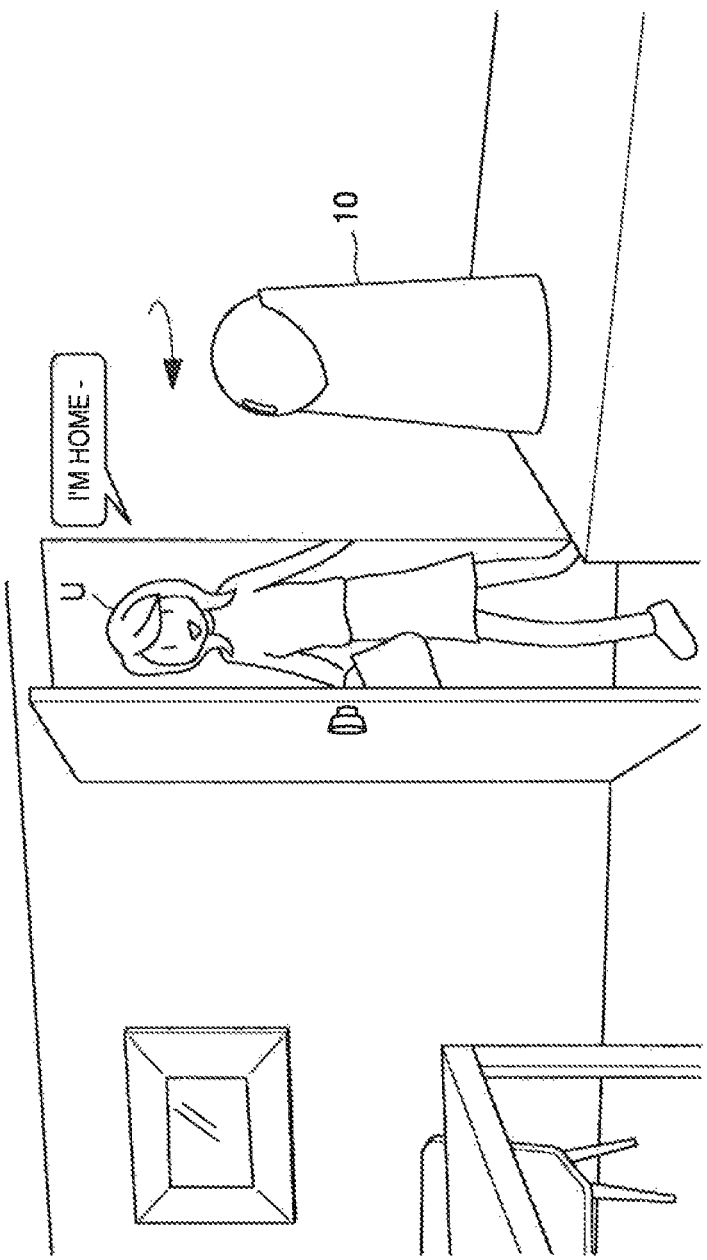
FIG. 1 is a diagram illustrating an overview of an information processing device according to an embodiment of the present disclosure.

Hereinafter, (a) preferred embodiments) of the present disclosure will be described in detail with reference to the appended drawings. In this specification and the appended drawings, structural elements that have substantially the same function and structure are denoted with the same reference numerals, and repeated explanation of these structural elements is omitted.

Note that, in this description and the drawings, structural elements that have substantially the same function and structure are sometimes distinguished from each other using different numbers after the same reference sign. However, when there is no need in particular to distinguish structural elements that have substantially the same function and structure, the same reference sign alone is attached.

Note that, the description is given in the following order.
1. Embodiment of present disclosure
1.1 Overview
1.2. Functional configuration example
1.3. Details of functions
1.4. Hardware configuration example
2. Conclusion

1. Embodiment of Present Disclosure

1.1 Overview

First, with reference to drawings, an overview of an information processing device according to an embodiment of the present disclosure will be described. FIG. 1 is a diagram illustrating the overview of the information processing device according to the embodiment of the present disclosure. As illustrated in FIG. 1, an information processing device 10 and a user U are in the embodiment of the present disclosure.

Note that, in the present specification, it is mainly assumed that the information processing device 10 functions as an agent. Here, the agent is a device configured to autonomously determine intention of the user U by interpreting input information of the user U, and control execution of a process based on the intention of the user U. In the present specification, it is assumed that the information processing device 10 is a robot, and sometimes the information processing device 10 is referred to as the agent.

There are various kinds of input information of the user U. For example, the input information includes information on a situation of the user U. Examples of the information on the situation of the user U include a problem that the user U has. However, the information on the situation of the user U is not limited to the problem that the user U has. For example, the information on the situation of the user U may be a request from the user U or may be a question from the user U. Alternatively, the information on the situation of the user U may be other information on the situation of the user U.

With reference to FIG. 1, the overview of the information processing device 10 has been described.

1.2. Functional Configuration Example

Figure 2:
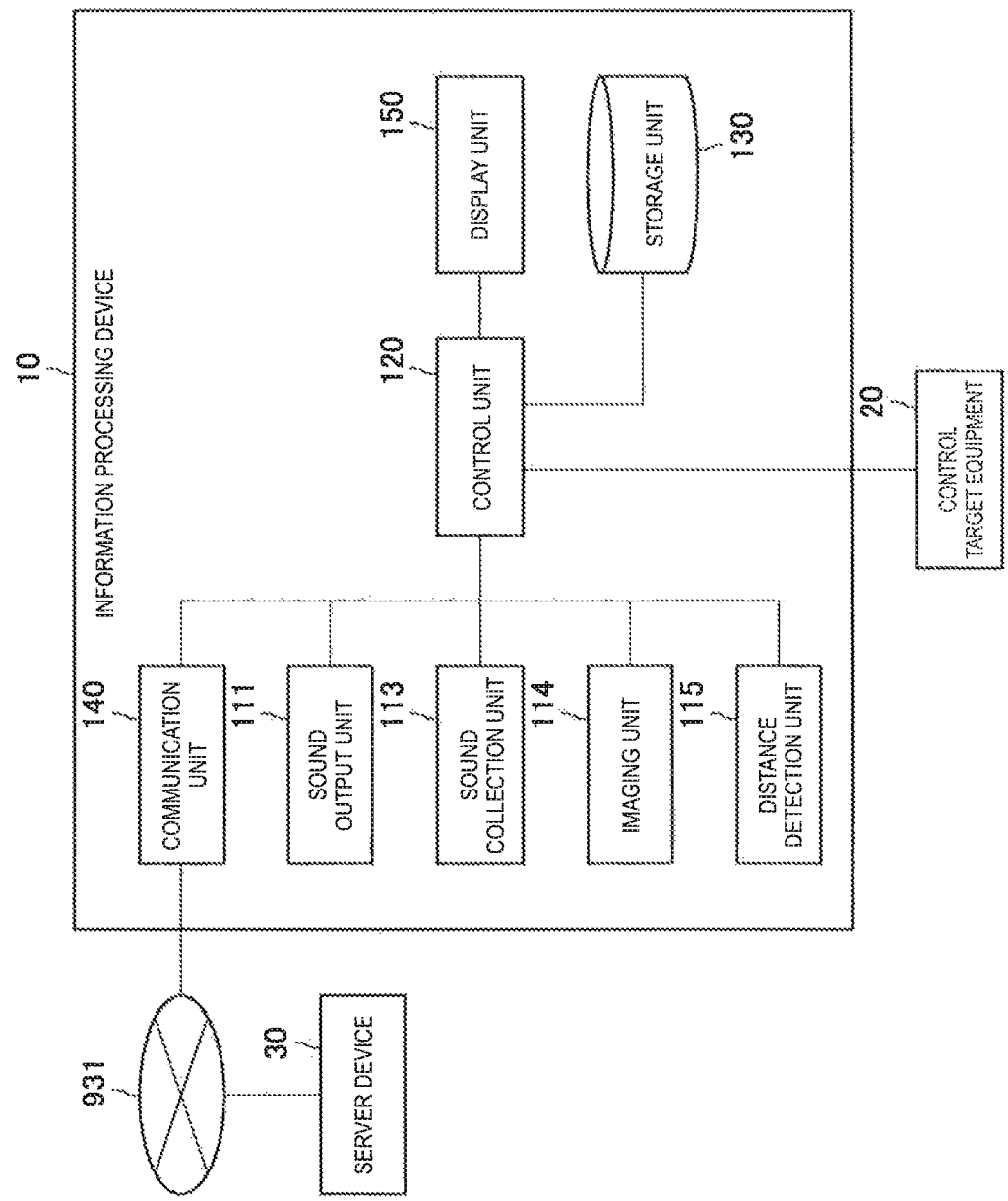
FIG. 2 is a diagram illustrating a functional configuration example of the information processing device.

Next, a functional configuration example of the information processing device 10 will be described. FIG. 2 is a diagram illustrating the functional configuration example of the information processing device 10. As illustrated in FIG. 2, the information processing device 10 includes a sound output unit 111, a sound collection unit 113, an imaging unit 114, a distance detection unit 115, a control unit 120, a storage unit 130, a communication unit 140, and a display unit 150. The information processing device 10 and control target equipment 20 are capable of communicating with each other via a network (such as a wireless local area network (LAN)). In addition, the information processing device 10 is connected with a server device 30 via a communication network 931. For example, the communication network 931 is implemented by the Internet.

The control target equipment 20 is equipment capable of accepting a command from the information processing device 10 and executing the command. Here, the type of the control target equipment 20 is not specifically limited. For example, the control target equipment 20 may be a television device, a recorder, an air conditioning device (hereinafter, also referred to as air conditioner), a coffeemaker, or a light.

The sound output unit 111 has a function of outputting sound. For example, the sound output unit 111 includes a speaker, and the sound is output through the speaker. The number of speakers included in the sound output unit 111 is not specifically limited as long as the number of speakers is one or more. In addition, positions of the one or more speakers included in the sound output unit 111 are not specifically limited. Note that, the sound output unit 111 may include a sound output device other than the speaker (such as earphones or headset) as long as the device has a sound outputting function.

The sound collection unit 113 has a function of acquiring sound through sound collection. For example, the sound collection unit 113 includes a microphone, and the sound is collected through the microphone. The number of microphones included in the sound collection unit 113 is not specifically limited as long as the number of microphones is one or more. In addition, positions of the one or more microphones included in the sound collection unit 113 are not specifically limited. Note that, the sound collection unit 113 may include a sound collection device other than the microphone as long as the device has a sound information collection function.

The imaging unit 114 has a function of inputting an image through image capturing. For example, the imaging unit 114 includes a camera, and an image captured by the camera is input. The number of cameras included in the imaging unit 114 is not specifically limited as long as the number of cameras is one or more. In addition, positions of the one or more cameras included in the imaging unit 114 are not specifically limited. In addition, the one or more cameras may include a monocular camera, or may include a stereo camera.

The distance detection unit 115 has a function of detecting a distance to a user. For example, the distance detection unit 115 includes a ranging sensor, and acquires a distance to a user detected by the ranging sensor. A position of the ranging sensor is not specifically limited. In addition, the type of the ranging sensor is not specifically limited. For example, the distance sensor may be an infrared distance sensor or may be an ultrasonic distance sensor.

The communication unit 140 has functions of acquiring data from the server device 30 connected with the communication network 931 and providing data to the server via the communication network 931. For example, the communication unit 140 is implemented by a communication interface. Note that, the number of the server devices 30 connected with the communication network 931 may be one or more.

The storage unit 130 is a storage medium configured to store programs to be executed by the control unit 120 and store data necessary for executing the programs. In addition, the storage unit 130 temporarily stores data for computation to be performed by the control unit 120. The storage device 130 may be implemented by a magnetic storage unit device, a semiconductor storage device, an optical storage device, a magneto-optical storage device, or the like.

The display unit 150 has a function of displaying various kinds of screens. In this embodiment, it is mainly assumed that the display unit 150 is a projector. However, the type of the display unit 150 is not limited. For example, the display unit 150 may be a liquid crystal display or an organic electro-luminescence (EL) display as long as the display unit 150 is a display capable of displaying screens that are visible by users. In addition, in this specification, it is mainly assumed that the display unit 150 displays a screen at a relatively high position (such as a wall) or at a relatively low position (such as a body of the agent or a place near hands of a user). However, the position at which the display unit 150 displays a screen is not limited.

Figure 3:
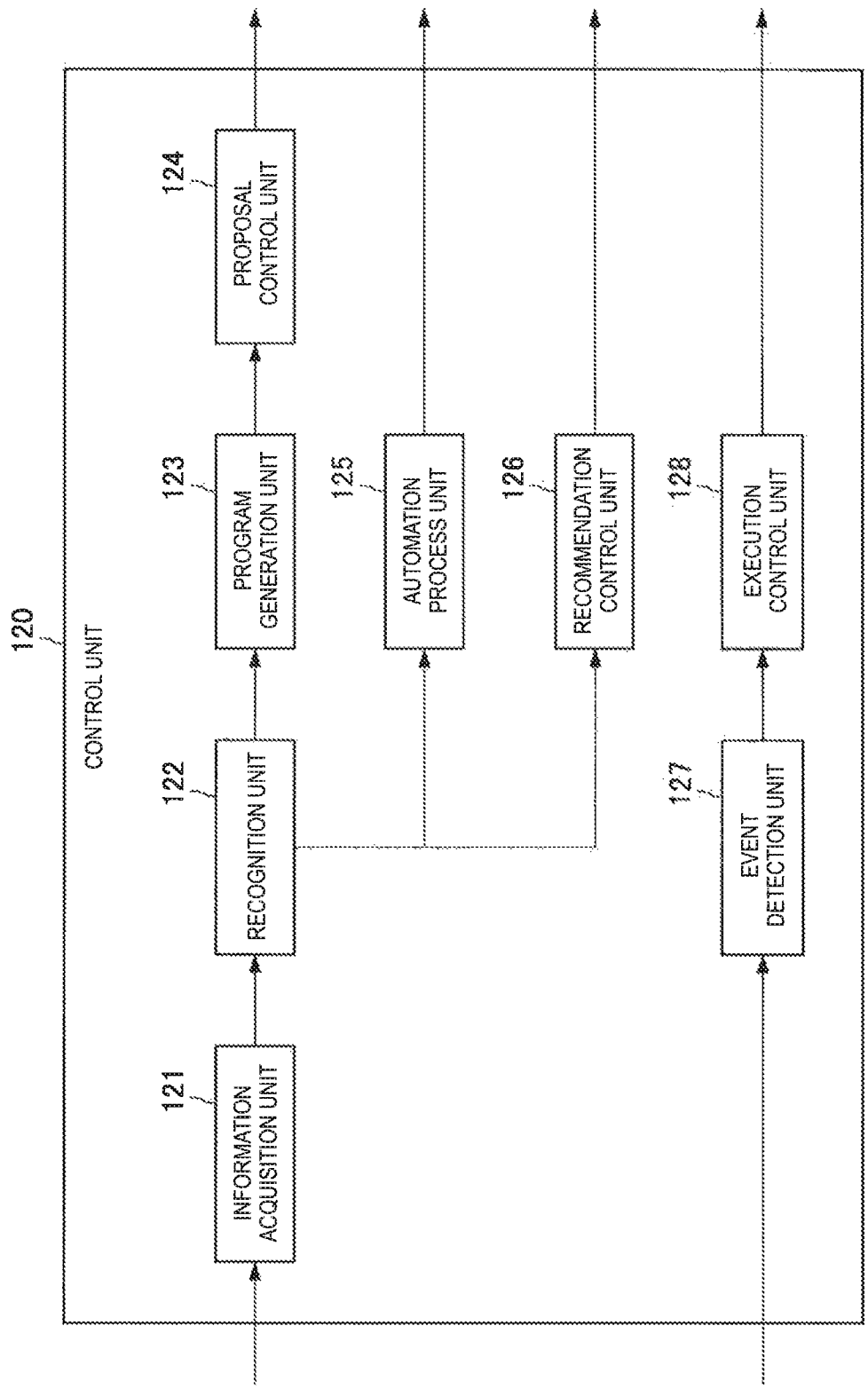
FIG. 3 is a diagram illustrating a detailed configuration example of a control unit.

The control unit 120 controls the respective units in the information processing device 10. FIG. 3 is a diagram illustrating a detailed configuration example of the control unit 120. As illustrated in FIG. 3, the control unit 120 includes an information acquisition unit 121, a recognition unit 122, a program generation unit 123, a proposal control unit 124, an automation process unit 125, a recommendation control unit 126, and an event detection unit 127, and an execution control unit 128. Details of these functional blocks will be described later. Note that, for example, the control unit 120 may be implemented by a central processing unit (CPU) or the like. In the case where the control unit 120 is implemented by a processing device such as the CPU, the processing device may be implemented by an electronic circuit.

Note that, hereinafter, the wording "voice" (or "speech") and the wording "sound" are used differently. Specifically, with regard to sound collected by the sound collection unit 113, the "voice" and the "speech" mainly means speech from a user, and the "sound" means both speech from a user and sound made by stuffs.

The functional configuration example of the information processing device 10 according to the embodiment has been described above.

1.3. Details of Functions

Next, details of the functions of the information processing device 10 will be described. In recent years, various kinds of technologies have been disclosed with regard to technologies of recommending applications to users. For example, a technology of recommending another application to a user at a time of execution of an application is disclosed. The another application corresponds to relevant information of the application. In addition, a technology of recommending a function or another application to a user is disclosed. The function corresponds to a function currently being executed by an application.

In addition to the recommendation of applications to users, there are technologies of proposing automation of execution of the applications to the users. However, sometimes a user's desired timing of automation of an application is different from a proposed timing of automation of the application. Therefore, in general, it is difficult to cause the user to configure settings for automation even when the user feels that the automation has benefits.

In addition, in the case where combinations of applications to be automatically executed are presented to the user at a timing at which the user does not think the automation is worth much, the user is expected not to imagine what happens through the combinations of the applications. On the other hand, in the case where an explanation about what happens through the combinations thereof is presented to the user, the user has to read the lengthy explanation. Therefore, it is difficult to select a combination that the user wants to execute from among the combinations.

Accordingly, in the present specification, the present disclosure mainly provides the technology capable of proposing automation of execution of programs at a timing convenient for a user. Specifically, the information acquisition unit 121 is configured to acquire input information of a user. In addition, the recognition unit 122 is configured to recognize a first program from the input information.

The input information may be voice of the user U. At this time, the recognition unit 122 recognizes the voice of the user U as text data from sound information collected through the sound collection unit 113. Alternatively, the input information may be an image captured by the imaging unit 114. The image is related to behavior of the user U. Here, the image related to the behavior of the user U may include a gesture of the user U or operation information of the control target equipment 20. The operation information of the control target equipment 20 may be considered as change in images of the control target equipment. At this time, the recognition unit 122 recognizes the behavior of the user U as text data from the images captured by the imaging unit 114. Alternatively, the operation information of the control target equipment 20 may be information input through the control target equipment 20 operated by the user U on the basis of the operation. At this time, the recognition unit 122 recognizes the operation performed by the user U as text data from the information input on the basis of the operation. Here, the gesture of the user U serving as the input information may be operation of the user U operating a controller of the control target equipment 20 or may be movement of a hand or an arm of the user U. From the movement of the hand or the arm of the user U, operation of a gesture control device may be recognized. The gesture control device receives a gesture of the user U as the input information. For example, the gesture control device is a contact or contactless device configured to recognize a gesture of a user and output video or the like.

The recognition unit 122 recognizes the first program on the basis of the recognized text data. Nate that, the first program is recognized in any way. For example, the text data and the first program may be registered on a database in association with each other in advance. Subsequently, it is only necessary for the recognition unit 122 to acquire a first program corresponding to recognized text data (such as a first program associated with text data that is identical or similar to the recognized text data) from the database.

The storage unit 130 stores the first program recognized in such a way. The first program includes at least a process. The execution control unit 128 controls execution of the process. In other words, the information processing device 10 acts as an agent to vicariously execute (for example, immediately) information input by the user U. In the case where the first program includes an event and a process, the execution control unit 128 controls execution of the process when the event detection unit 127 detects the event. In other words, the information processing device 10 acts as an agent to vicariously execute information input by the user U, in the future.

In addition, the program generation unit 123 is configured to generate a second program from the first program. The proposal control unit 124 is configured to propose automation of control related to the input information at an acquisition timing of the input information. In this case, the proposal control unit 124 is configured to propose automation of control of execution of the second program. According to such configurations, it is possible to propose automation of execution of programs at a timing convenient for the user U.

Here, the acquisition timing of the input information is not limited to an instantaneous timing when the input information is acquired. In other words, the acquisition timing of the input information may be concept with a certain length of duration. For example, the acquisition timing of the input information may be a timing based on at least one of context during acquiring the input information, context before acquiring the input information, and context after acquiring the input information.

Specifically, the acquisition timing of the input information may be a timing when the information processing device 10 acquires the input information, or a timing after a predetermined time has elapsed since acquisition of the input information (for example, a timing of an interval between other conversations between the information processing device 10 and the user U generated in association with the input information, or a timing when the other conversations finish). Alternatively, the acquisition timing of the input information may be a timing during vicarious execution of the input information or a timing when the vicarious execution of the input information finishes. At least one of such situations of acquisition of the input information may be considered as the context during acquiring the input information or the context after acquiring the input information. Alternatively, the environmental information acquired by the information processing device 10 before acquiring the input information may be considered as the context before acquiring the input information. Automation of control related to the input information may be appropriately proposed at a timing based on at least one of such context.

It is possible to propose the automation in any way. The automation may be proposed by the sound output unit 111 controlling output of voice of proposal content, or by the display unit 150 controlling display of proposal content.

The automation process unit 125 automates control of execution of the second program in the case where an answer that the proposal of the automation is accepted is obtained from the user U. The answer from the user U may be acquired as voice of the user U recognized from sound information collected through the sound collection unit 113, or may be acquired as a gesture of the user U recognized from images captured by the imaging unit 114.

For example, in the case where the second program includes an event and a process, automation of control of execution of the second program means that the storage unit 130 records the second program such that the process is executed when the event is detected. The execution control unit 128 controls execution of the second program in accordance with the automation.

It is possible to propose the automation every time input information is acquired. However, the user U may not want automation proposal made every time input information is acquired. Accordingly, it is possible for the proposal control unit 124 to propose temporal execution of the program at an acquisition timing of input information in the case where a predetermined condition is not satisfied, and propose automation in the case where the predetermined condition is satisfied. In addition, it is possible for the proposal control unit 124 not to propose the automation after the user U accepts the proposal of the automation. Alternatively, it is possible not to propose the automation in the case where the user U refuses the proposal of the automation. Here, the temporal execution may be considered as an alternate process executed on the basis of acceptance by the user U when a predetermined condition is satisfied.

For example, when the user U accepts proposal of temporal execution to a certain extent, it is considered that the user feels less inconvenience even if automation is proposed from next time, instead of the temporal execution. Therefore, the predetermined condition for avoiding proposal of the automation may be a condition that an answer that a proposal of temporal execution is accepted is obtained from the user U more than a certain number of times (first number of times) and the user U accepts the proposal of the automation.

As a specific example, a case where a work of turning on an air conditioner is automated when a room temperature becomes 29° C. will be described. First, when the room temperature becomes 29° C., the proposal control unit 124 asks "do you want to turn on the air conditioner?" to the user U, and checks whether the user U wants to turn on the air conditioner when the room temperature becomes 29° C. (proposal of temporal execution). The proposal control unit 124 proposes an automated process for turning on the air conditioner every time the room temperature becomes 29° C. to the user U in the case where the proposal of temporal execution is successively accepted several times, or in the case where the proposal is accepted at a predetermined frequency or more.

In general, a temperature at which a user feels hot (such as 29° C.) is depending on each user. In addition, determination of whether to turn on the air conditioner at the temperature at which a user feels hot is also depending on each user. For example, even when a user feels hot at 29° C. and the user is asked "do you want to turn on the air conditioner?", sometimes the user wants to turn on the air conditioner when the room temperature becomes 28° C., and sometimes the user wants to turn on the air conditioner when the room temperature becomes 30° C.

A detailed example of a way to propose the automation to the user U on the basis of such circumstances will be described below. First, in a first step, the proposal control unit 124 proposes temporal execution such that "I will turn on the air conditioner since the room temperature reaches 29° C.". In other words, the proposal control unit 124 does not propose automation suddenly but proposes temporal execution several times, for example. Accordingly, the proposal control unit 124 can check whether the user U has repeatedly accepted the proposal of temporal execution. Here, the number of times of the proposal of the temporal execution may be only one. After the proposal of temporal execution is accepted, the proposal control unit 124 confirms the acceptance with the user U such that "I will turn on the air conditioner when the room temperature reaches 29° C." with regard to the proposal of automation. According to these proposal steps, it is possible to understand from the proposal of temporal execution that the user U feels comfortable when the air conditioner is turned on in the case where the room temperature reaches 29° C.

As another specific example, a case where automation is suddenly proposed when a condition for proposal of the automation is satisfied will be described. For example, in the case where an air circulator fan is turned on after turning on the air conditioner, it is easy to understand the user's intention that the user U wants to use the air circulator fan together with the air conditioner, in comparison to the case of trying to understand whether the user U wants to turn on the air conditioner when the room temperature reaches 29° C. In such a case, for example, the proposal control unit 124 may not propose temporal execution but propose turning on the air circulator fan when a condition that the user turns on the air conditioner is satisfied. In such a case, as a reason of the proposal of automation, a reason of the proposal of automation is provided as knowledge (information) to the user U such as a reason that usage of the air circulator fan during usage of the air conditioner can save energy. Such knowledge may be acquired from a server, for example.

Alternatively, it is considered that the user may feel that the proposal of next temporal execution and proposal of automation is burdensome when temporal execution or automation is proposed to the user U a certain number of times. Therefore, the predetermined condition for avoiding proposal of the temporal execution or the automation may be a condition that the temporal execution is proposed to the user U more than a certain number of times (second number of times) and the automation is proposed to the user U at least once. In this case, the predetermined condition for avoiding proposal of the temporal execution or proposal of the automation may be independent from an answer from the user U to the proposal of automation.

Note that, the relation between the first program and the second program is not specifically limited. For example, the first program and the second program may include programs related to pieces of software independent from each other. Alternatively, the first program and the second program may include programs related to an identical piece of software. Here, the software is not limited to applications. The software may be concept including at least any one of system software and application software.

For example, in the case where the first program and the second program include programs related to pieces of software independent from each other, it is assumed that the first program controls system software of the air conditioner and the second program controls system software of the air circulator fan. On the other hand, in the ease where the first program and the second program include programs related to an identical piece of software, it is assumed that both the first program and the second program control an application for ringing an alarm clock.

The method for generating the second program from the first program by the program generation unit 123 is not limited. For example, the program generation unit 123 may generate the second program by adding a first relevant element to the first program. The first relevant element is related to an input element included in the first program. The input element may be a process included in the first program, or may be an object of the process included in the first program.

Alternatively, the program generation unit 123 may generate the second program by replacing the input element in the first program with a second relevant element related to the input element in the first program.

The number of candidates for the relevant element related to the input element may be one or more. In this case, a plurality of candidates may be proposed to the user U on the basis of any priority (for example, in proposal order). For example, in the case where there are a plurality of candidates for the relevant element related to the input element, the proposal control unit 124 proposes the automation on the basis of the number of times of activation of a piece of software related to each of the plurality of candidates. For example, a candidate in cooperation with software that has been activated a large number of times may be preferentially proposed to the user U.

In addition, there may be a candidate in cooperation with software that has not been installed. For example, the proposal control unit 124 may decrease priority of the candidate such that the priority of the candidate becomes lower than priority of a candidate in cooperation with software that has already been installed. In addition, the proposal control unit 124 may add a mark to the candidate in cooperation with software that has not been installed. The mark indicates that installation is necessary. Hereinafter, sometimes the input element included in the first program may be referred to as an "associative key".

Next, an image of automated execution of the second program will be described. FIG. 4 is a diagram illustrating the image of automated execution of the second program. As illustrated in FIG. 4, it is assumed that the second program includes a trigger "at 29° C.", a process "if someone is in the room", a process "turn on the air conditioner set to 25° C.", a process "if a gas stove is not turned on", and a process "turn on the air circulator fan".

First, the event detection unit 127 periodically performs "temperature acquisition". When an event that the temperature "exceeds 29° C." is detected, the execution control unit 128 controls execution of a process "confirmation of presence of someone". When the event detection unit 127 periodically performs "acquisition of data from a motion detector" and an event that someone is in the room is detected, the execution control unit 128 controls execution of the process "turn on the air conditioner set to 25° C.".

Next, the execution control unit 128 treats completion of the process "turn on the air conditioner set to 25° C." as occurrence of an event, and controls execution of a process "acquire gas stove information". When the event detection unit 127 periodically performs "acquisition of data from a gas sensor" and an event that the gas stove is not turned on is detected, the execution control unit 128 controls execution of the process "turn on the air circulator fan". Completion of the process "turn on the air circulator fan" may also be treated as occurrence of an event.

Here, patterns of proposals of automation to the user U are classified. FIG. 5 is a classification table of patterns of proposals of automation to the user U. In FIG. 5, "U" indicates the user U, and "A" indicates the information processing device 10. First, timings of automation proposals are roughly classified into four timings. A first timing is a timing when the user U asks the information processing device 10 to execute input information (a timing when the information processing device 10 vicariously executes the first program) ((1) to (3)).

A second timing is a timing when automation is set with regard to the first program that is to be vicariously executed by the information processing device 10 in the future ((4) to (6)). A third timing is a timing when the user U causes the process to be executed by himself/herself ((7) to (9)). A fourth timing is a timing when the information processing device 10 and the user U have a conversation ((10) to (12)).

There may be three proposal contents in each of the four timings. A first proposal content is proposal of automation of the second program generated by setting a process included in the first program as the associative key and by adding a condition to the process. A second proposal content is proposal of automation of the second program generated by setting a process included in the first program as the associative key and by adding another process to the process. A third proposal content is proposal of automation of the second program generated by setting an object of a process included in the first program as the associative key and by utilizing the object.

Therefore, the 12 automation proposal patterns are assumed in total. Next, each of the 12 automation proposal patterns will be described. FIG. 6 is a diagram illustrating a specific example of the first pattern. In addition, FIG. 7 is a diagram illustrating an image of settings of automation with regard to the first pattern. As illustrated in FIG. 6, when the user U inputs input information "what's the weather like?", the information processing device 10 performs a process "acquire weather information" and a process "notify of weather information" in response to the input information "what's the weather like?".

In addition, as illustrated in FIG. 6, the information processing device 10 proposes automation such as "may I tell you if it rains?" at an acquisition timing of the weather information. When the user inputs an answer "yes, please" indicating that the user accepts the proposal of automation, the information processing device 10 automates a process "tell the user if it rains". Subsequently, the information processing device 10 periodically acquires weather information and automatically notifies the user if it will rain.

With reference to FIG. 7, details thereof will be described. When the user U inputs input information "what's the weather like?", the information acquisition unit 121 acquires the input information "what's the weather like?", and the recognition unit 122 recognizes the first program (the process "acquire weather information" and the process "notify of weather information") from the input information "what's the weather like?" by using the above described method. The execution control unit 128 controls execution of the first program.

On the other hand, the program generation unit 123 generates the second program from the first program. For example, the program generation unit 123 acquires the first process "acquire weather information" included in the first program as an input element, and acquires a condition "if it rains" related to the input element as a first relevant element. The program generation unit 123 generates the second program by adding the condition "if it rains" to the process "notify of weather information".

In this case, the program generation unit 123 may add an automation process routine to the second program (the process "acquire weather information", the condition "if it rains", and the process "notify of weather information") such that the second program is automatically executed. The automation process routine periodically triggers an event to execute the process "acquire weather information". In the example illustrated in FIG. 7, the event is triggered every 10 minutes. However, the interval of triggering the event is not limited to 10 minutes.

Subsequently, the proposal control unit 124 proposes automation of control of execution of the generated second program to the user U. In the case where an answer that the proposal is accepted is obtained from the user U, the automation process unit 125 automates control of execution of the generated second program, Subsequently, the execution control unit 128 acquires weather information. If the weather information indicates that it rains, the user U is notified of the weather information.

Figure 9:
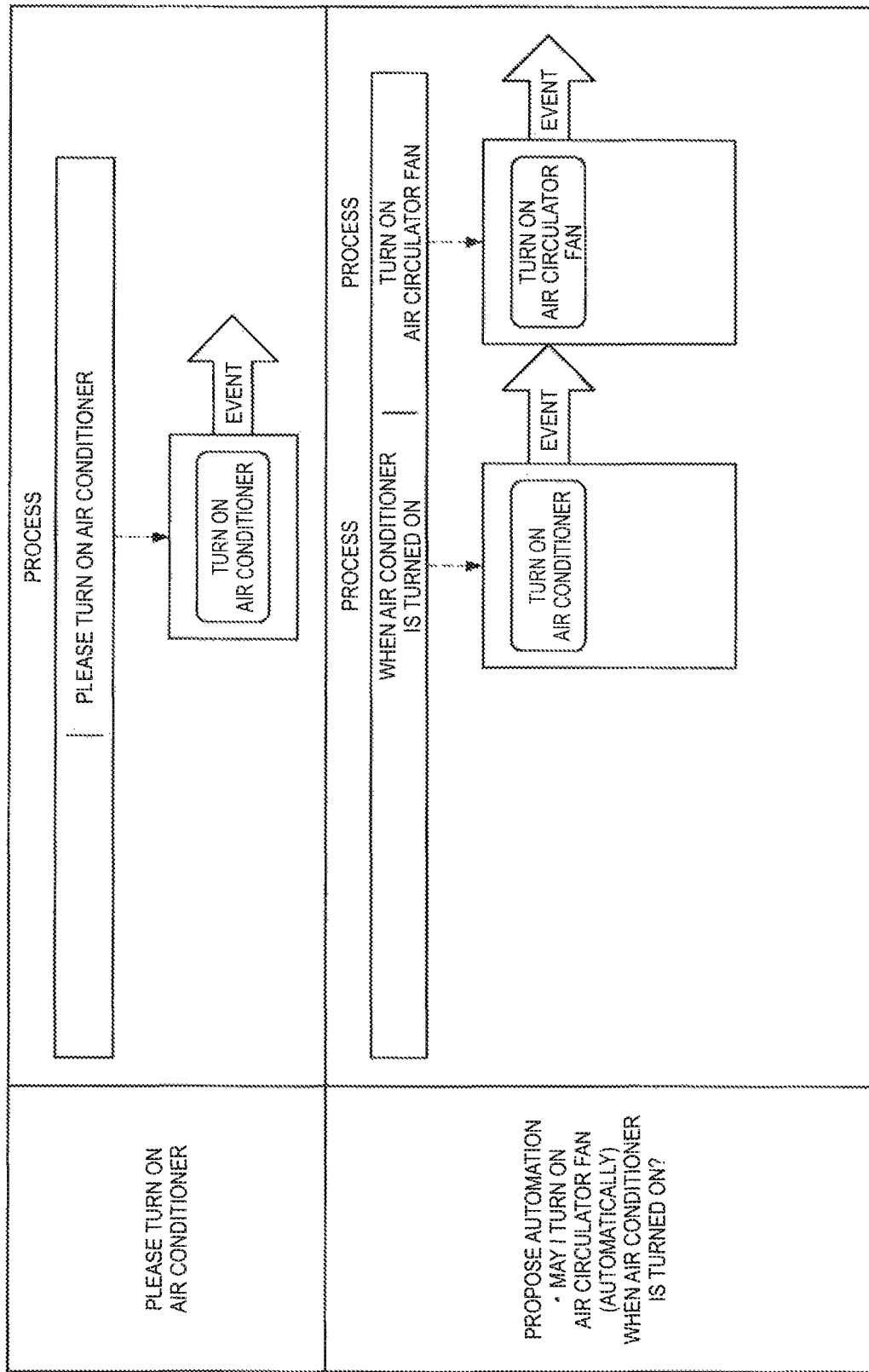
FIG. 9 is a diagram illustrating an image of settings of automation with regard to the second pattern.

FIG. 8 is a diagram illustrating a specific example of the second pattern. In addition, FIG. 9 is a diagram illustrating an image of settings of automation with regard to the second pattern. As illustrated in FIG. 8, when the user U inputs input information "please turn on the air conditioner", the information processing device 10 performs the process "turn on the air conditioner" in response to the input information "please turn on the air conditioner".

In addition, as illustrated in FIG. 8, the information processing device 10 proposes automation such as "may I turn on the air circulator fan when the air conditioner is turned on?" at a timing of the process for turning on the air conditioner. When the user inputs an answer "yes, please" indicating that the user accepts the proposal of automation, the information processing device 10 automates a process "turn on the air circulator fan when the air conditioner is turned on". Subsequently, the information processing device 10 turn on the air circulator fan when the air conditioner is turned on (automatically or by user operation).

With reference to FIG. 9, details thereof will be described. When the user inputs input information "please turn on the air conditioner", the information acquisition unit 121 acquires the input information "please turn on the air conditioner", and the recognition unit 122 recognizes the first program (the process "turn on the air conditioner") from the input information "please turn on the air conditioner" by using the above described method. The execution control unit 128 controls execution of the first program.

On the other hand, the program generation unit 123 generates the second program from the first program. For example, the program generation unit 123 acquires the process "turn on the air conditioner" included in the first program as an input element, and acquires the process "turn on the air circulator fan" related to the input element as a first relevant element. The program generation unit 123 uses completion of the process "turn on the air conditioner" as an event, and generates the second program by adding the process "turn on the air circulator fan" as a process to be executed when the event is detected.

Subsequently, the proposal control unit 124 proposes automation of control of execution of the generated second program to the user U. In the case where an answer that the proposal is accepted is obtained from the user U, the automation process unit 125 automates control of execution of the generated second program. Subsequently, the execution control unit 128 turns on the air circulator fan when the air conditioner is turned on.

Figure 10:
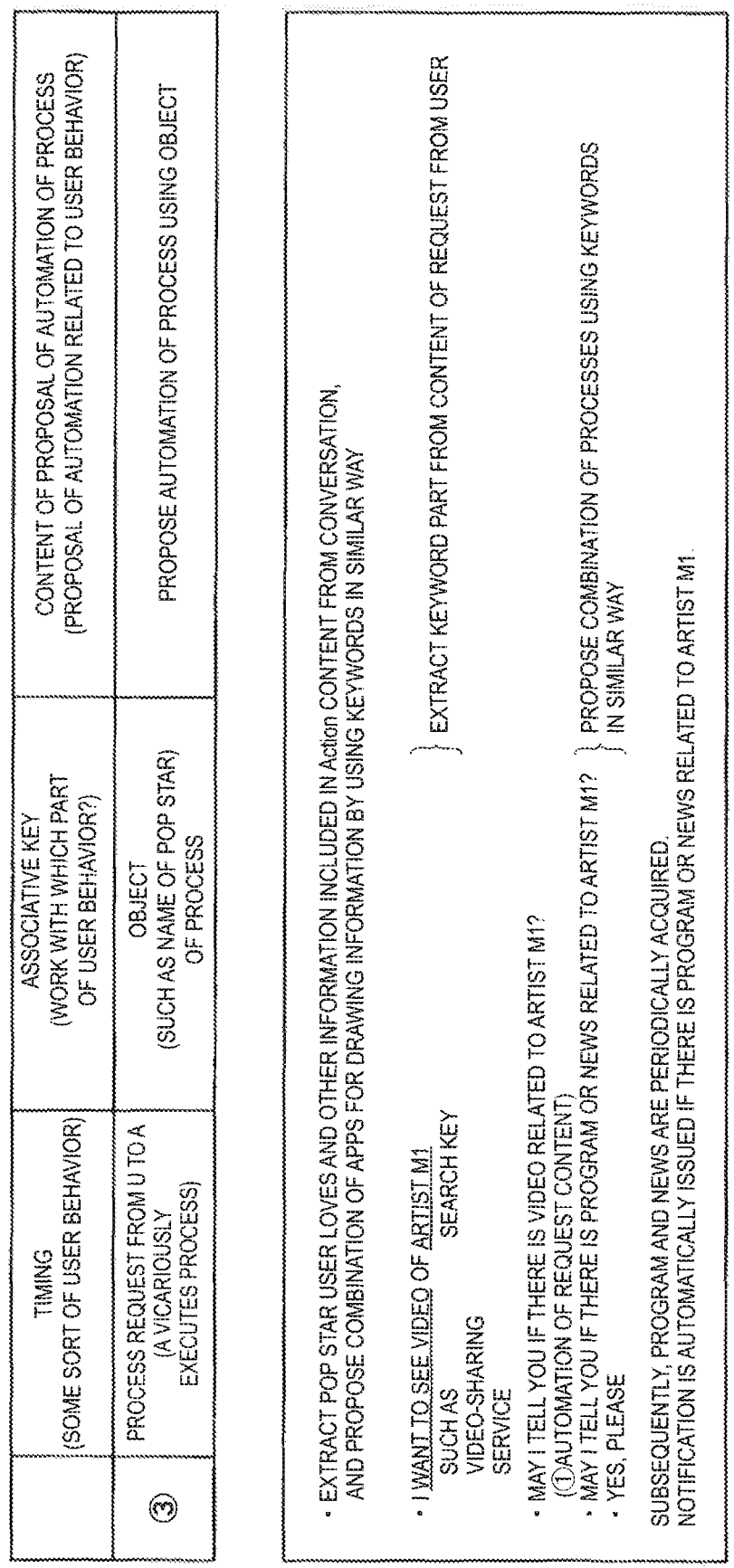
FIG. 10 is a diagram illustrating a specific example of a third pattern.
Figure 11:
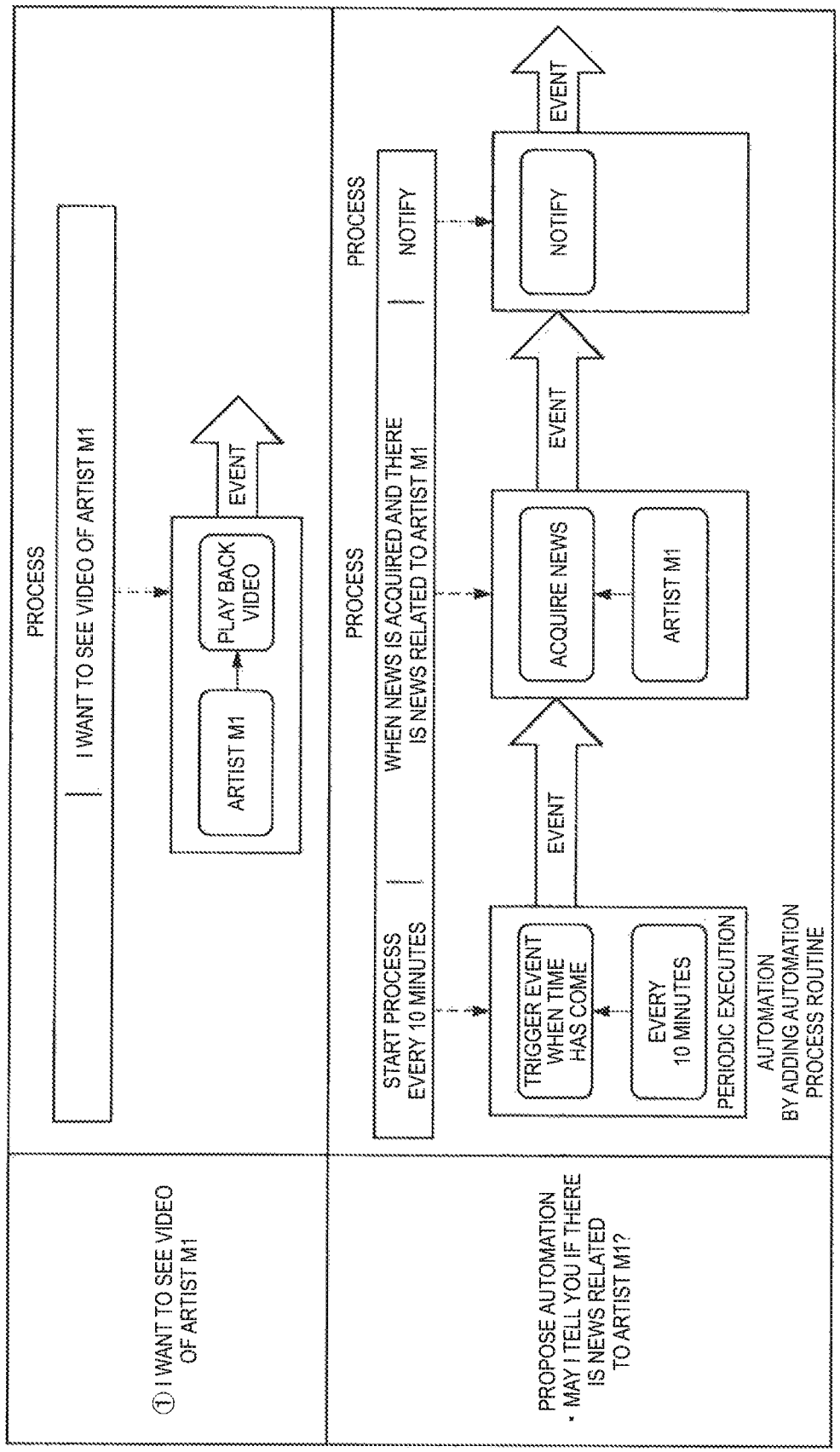
FIG. 11 is a diagram illustrating an image of settings of automation with regard to the third pattern.

FIG. 10 is a diagram illustrating a specific example of the third pattern. In addition, FIG. 11 is a diagram illustrating an image of settings of automation with regard to the third pattern. As illustrated in FIG. 10, when the user U inputs input information "I want to see video of the artist M1", the information processing device 10 performs a process "propose to tell the user U if there is video of the artist M1" in response to the input information "I wants to see video of the artist M1".

In addition, as illustrated in FIG. 10, the information processing device 10 proposes automation such as "may I tell you if there is a program or news related to the artist M1?" at a timing of such a proposal. When the user inputs an answer "yes, please" indicating that the user accepts the proposal of automation, the information processing device 10 automates a process "tell the user if there is a program or news related to the artist M1". Subsequently, the user U is automatically notified of the program or news related to the artist M1 if there is the program or news related to the artist M1.

With reference to FIG. 11, details thereof will be described. When the user inputs input information "I wants to see video of the artist M1", the information acquisition unit 121 acquires the input information "I wants to see video of the artist M1", and the recognition unit 122 recognizes the first program (an object "artist M1" and the process "play back video") from the input information "I wants to see video of the artist M1" by using the above described method. The execution control unit 128 controls execution of the first program.

On the other hand, the program generation unit 123 generates the second program from the first program. For example, the program generation unit 123 acquires the object "artist M1" of the process "play back video" included in the first program as an input element, and acquires the process "acquire news" related to the input element as a second relevant element. The program generation unit 123 generates the second program by replacing the process "play back video" with the process "acquire news", using completion of the process "acquire news" as an event, and adding the process "notify" as a process to be executed when the event is detected.

In this case, the program generation unit 123 may add an automation process routine to the second program (the process "acquire news" and the process "notify") such that the second program is automatically executed. The automation process routine periodically triggers an event to execute the process "acquire news". In the example illustrated in FIG. 11, the event is triggered every 10 minutes. However, the interval of triggering the event is not limited to 10 minutes.

Subsequently, the proposal control unit 124 proposes automation of control of execution of the generated second program to the user U. In the case where an answer that the proposal is accepted is obtained from the user U, the automation process unit 125 automates control of execution of the generated second program. Subsequently, when the news of the artist M1 is acquired, the execution control unit 128 notifies of the news.

Figure 13:
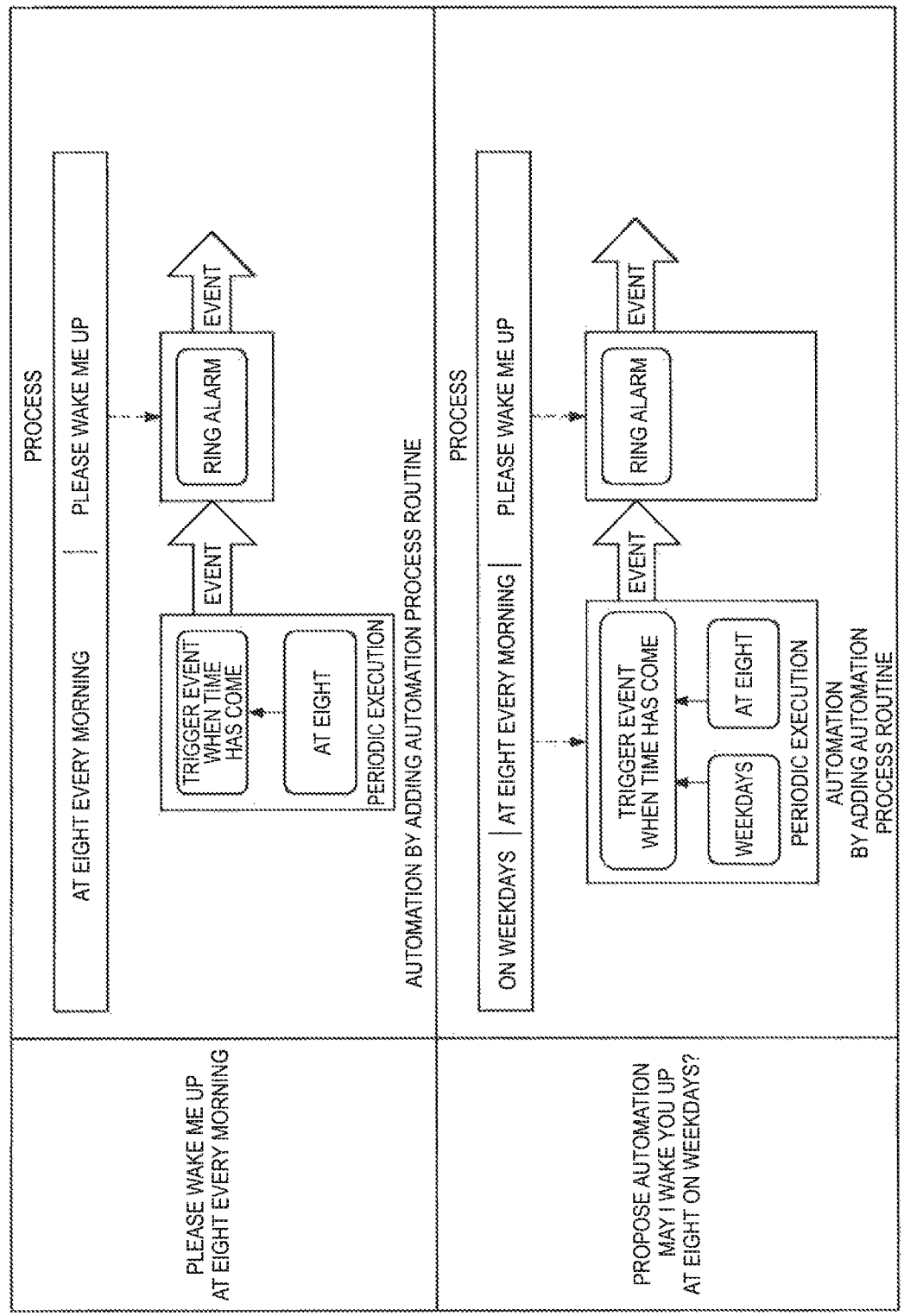
FIG. 13 is a diagram illustrating an image of settings of automation with regard to the fourth pattern.

FIG. 12 is a diagram illustrating a specific example of the fourth pattern. In addition, FIG. 13 is a diagram illustrating an image of settings of automation with regard to the fourth pattern. As illustrated in FIG. 12, when the user U inputs input information "please wake me up at eight every morning", the information processing device 10 extracts a process "trigger an event at eight every morning" and a process "ring an alarm" in response to the input information "please wake me up at eight every morning". The automation process unit 125 configures settings for automation of control of execution of the first program including the process "trigger an event at eight every morning" and the process "ring an alarm".

In addition, as illustrated in FIG. 12, the information processing device 10 proposes automation such as "but I will not wake you up on weekends" at a timing of configuring the settings for automation. When the user inputs an answer "OK" indicating that the user accepts the proposal of automation, the information processing device 10 automates a process "wake the user up at eight on weekdays only". Subsequently, the alarm automatically rings at eight on weekdays only.

With reference to FIG. 13, details thereof will be described. When the user U inputs input information "please wake me up at eight every morning", the information acquisition unit 121 acquires the input information "please wake me up at eight every morning", and the recognition unit 122 recognizes the first program (a condition "at eight", a process "trigger an event", and a process "ring the alarm") from the input information "please wake me up at eight every morning" by using the above described method. The automation process unit 125 configures settings for automation of control of execution of the first program.

On the other hand, the program generation unit 123 generates the second program from the first program. For example, the program generation unit 123 acquires the first process "trigger an event" included in the first program as an input element, and acquires a condition "on weekdays" related to the input element as a first relevant element. The program generation unit 123 generates the second program by adding the condition "on weekdays" to the process "trigger an event".

Subsequently, the proposal control unit 124 proposes automation of control of execution of the generated second program to the user U. In the case where an answer that the proposal is accepted is obtained from the user U, the automation process unit 125 automates control of execution of the generated second program. Subsequently, the execution control unit 128 causes the alarm to automatically ring at eight on weekdays only.

Figure 15:
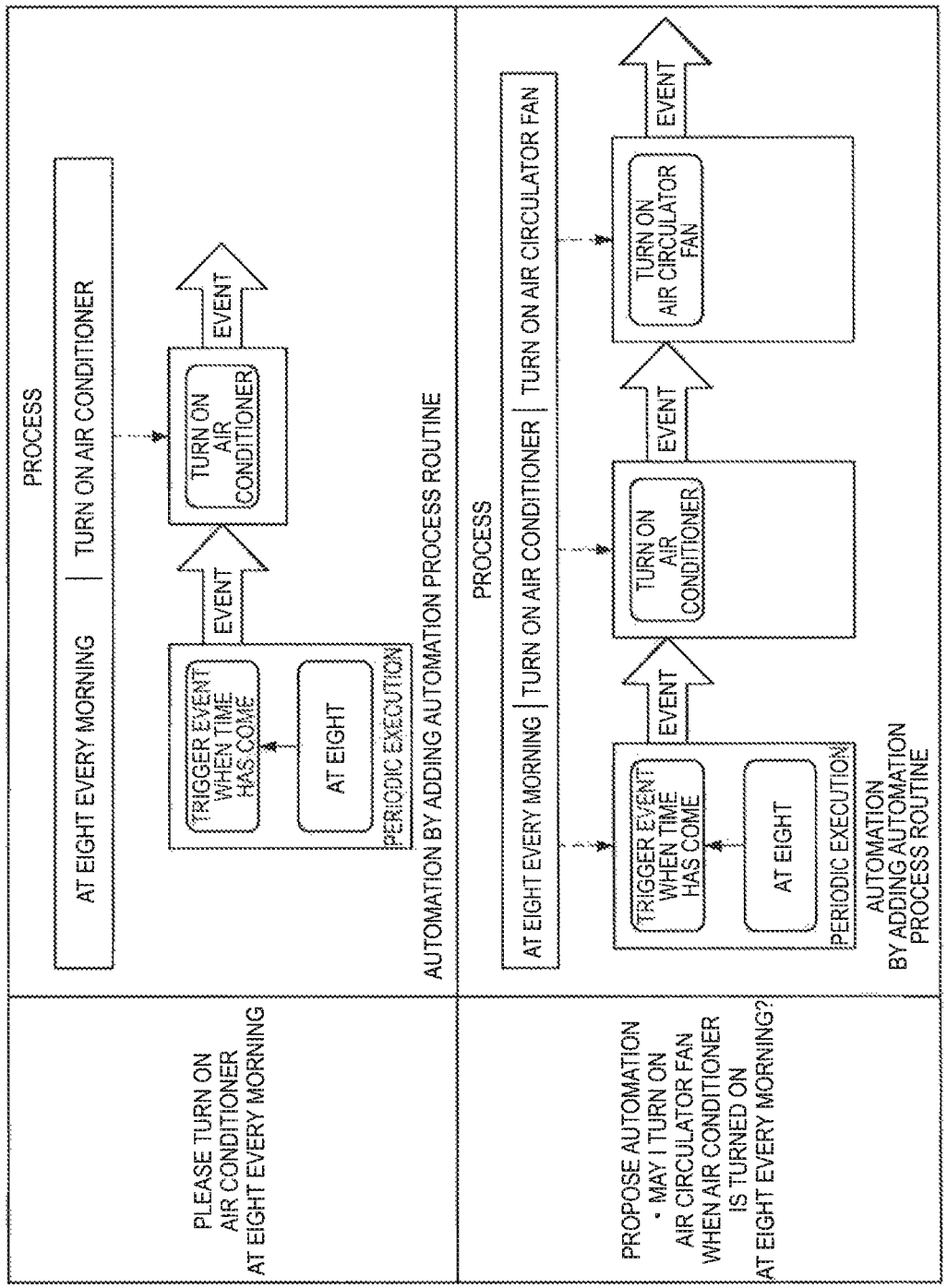
FIG. 15 is a diagram illustrating an image of settings of automation with regard to the fifth pattern.

FIG. 14 is a diagram illustrating a specific example of the fifth pattern. In addition, FIG. 15 is a diagram illustrating an image of settings of automation with regard to the fifth pattern. As illustrated in FIG. 14, when the user U inputs input information "please turn on the air conditioner at eight every morning", the information processing device 10 extracts a process "trigger an event at eight every morning" and a process "turn on the air conditioner" in response to the input information "please turn on the air conditioner at eight every morning". The automation process unit 125 configures settings for automation of control of execution of the first program including the process "trigger an event at eight every morning" and the process "turn on the air conditioner".

In addition, as illustrated in FIG. 14, the information processing device 10 proposes automation such as "may I turn on the air circulator fan when the air conditioner is turned on?" at a timing of configuring the settings for automation. When the user inputs an answer "yes, please" indicating that the user accepts the proposal of automation, the information processing device 10 automates a process "turn on the air circulator fan when the air conditioner is turned on". Subsequently, the information processing device 10 turns on the air circulator fan when the air conditioner is turned on (automatically or by user operation).

With reference to FIG. 15, details thereof will be described. When the user inputs input information "please turn on the air conditioner at eight every morning", the information acquisition unit 121 acquires the input information "please turn on the air conditioner at eight every morning", and the recognition unit 122 recognizes the first program (a condition "at eight", a process "trigger an event", and a process "ring the alarm") from the input information "please turn on the air conditioner at eight every morning" by using the above described method. The automation process unit 125 configures settings for automation of control of execution of the first program.

On the other hand, the program generation unit 123 generates the second program from the first program. For example, the program generation unit 123 acquires the process "turn on the air conditioner" included in the first program as an input element, and acquires the process "turn on the air circulator fan" related to the input element as a first relevant element. The program generation unit 123 uses completion of the process "turn on the air conditioner" as an event, and generates the second program by adding the process "turn on the air circulator fan" as a process to be executed when the event is detected.

Subsequently, the proposal control unit 124 proposes automation of control of execution of the generated second program to the user U. In the case where an answer that the proposal is accepted is obtained from the user U, the automation process unit 125 automates control of execution of the generated second program. Subsequently, the execution control unit 128 turns on the air circulator fan when the air conditioner is turned on.

Figure 17:
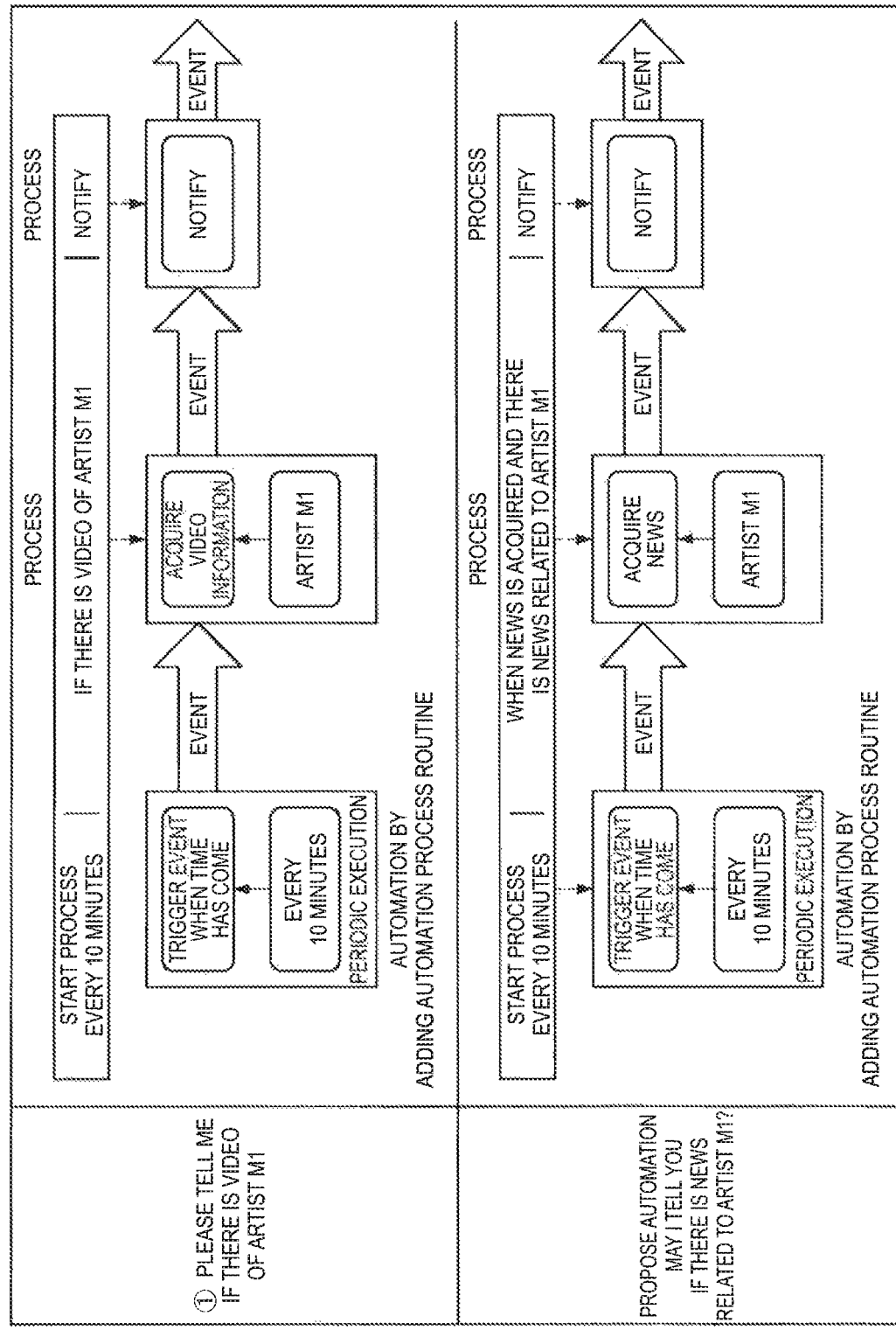
FIG. 17 is a diagram illustrating an image of settings of automation with regard to the sixth pattern.

FIG. 16 is a diagram illustrating a specific example of the sixth pattern. In addition, FIG. 17 is a diagram illustrating an image of settings of automation with regard to the sixth pattern. As illustrated in FIG. 16, when the user U inputs input information "please tell me if there is video of the artist M1", the information processing device 10 performs a process "propose to tell the user U if there is video of the artist M1" in response to the input information "please tell me if there is video of the artist M1".

In addition, as illustrated in FIG. 16, the information processing device 10 proposes automation such as "may I tell you if there is a program or news related to the artist M1?" at a timing of such a proposal. When the user inputs an answer "yes, please" indicating that the user accepts the proposal of automation, the information processing device 10 automates a process "tell the user if there is a program or news related to the artist M1". Subsequently, the user U is automatically notified of the program or news related to the artist M1 if there is the program or news related to the artist M1.

With reference to FIG. 17, details thereof will be described. When the user U inputs input information "please tell me if there is video of the artist M1", the information acquisition unit 121 acquires the input information "please tell me if there is video of the artist M1", and the recognition unit 122 recognizes the first program (a process "acquire video information" of an object "artist M1" and a process "notify of video information") from the input information "please tell me if there is video of the artist M1" by using the above described method. The automation process unit 125 configures settings for automation of control of execution of the first program.

In this case, the program generation unit 123 may add an automation process routine to the first program (the process "acquire video information" of the object "artist M1" and the process "notify of video information") such that the first program is automatically executed. The automation process routine periodically triggers an event to execute the process "acquire video information". In the example illustrated in FIG. 17, the event is triggered every 10 minutes. However, the interval of triggering the event is not limited to 10 minutes.

On the other hand, the program generation unit 123 generates the second program from the first program. For example, the program generation unit 123 acquires the object "artist M1" of the process "acquire video information" included in the first program as an input element, and acquires the process "acquire news" related to the input element as a second relevant element. The program generation unit 123 generates the second program by replacing the process "play back video" with the process "acquire news".

Subsequently, the proposal control unit 124 proposes automation of control of execution of the generated second program to the user U. In the case where an answer that the proposal is accepted is obtained from the user U, the automation process unit 125 automates control of execution of the generated second program. Subsequently, when the news of the artist M1 is acquired, the execution control unit 128 notifies of the news.

Figure 19:
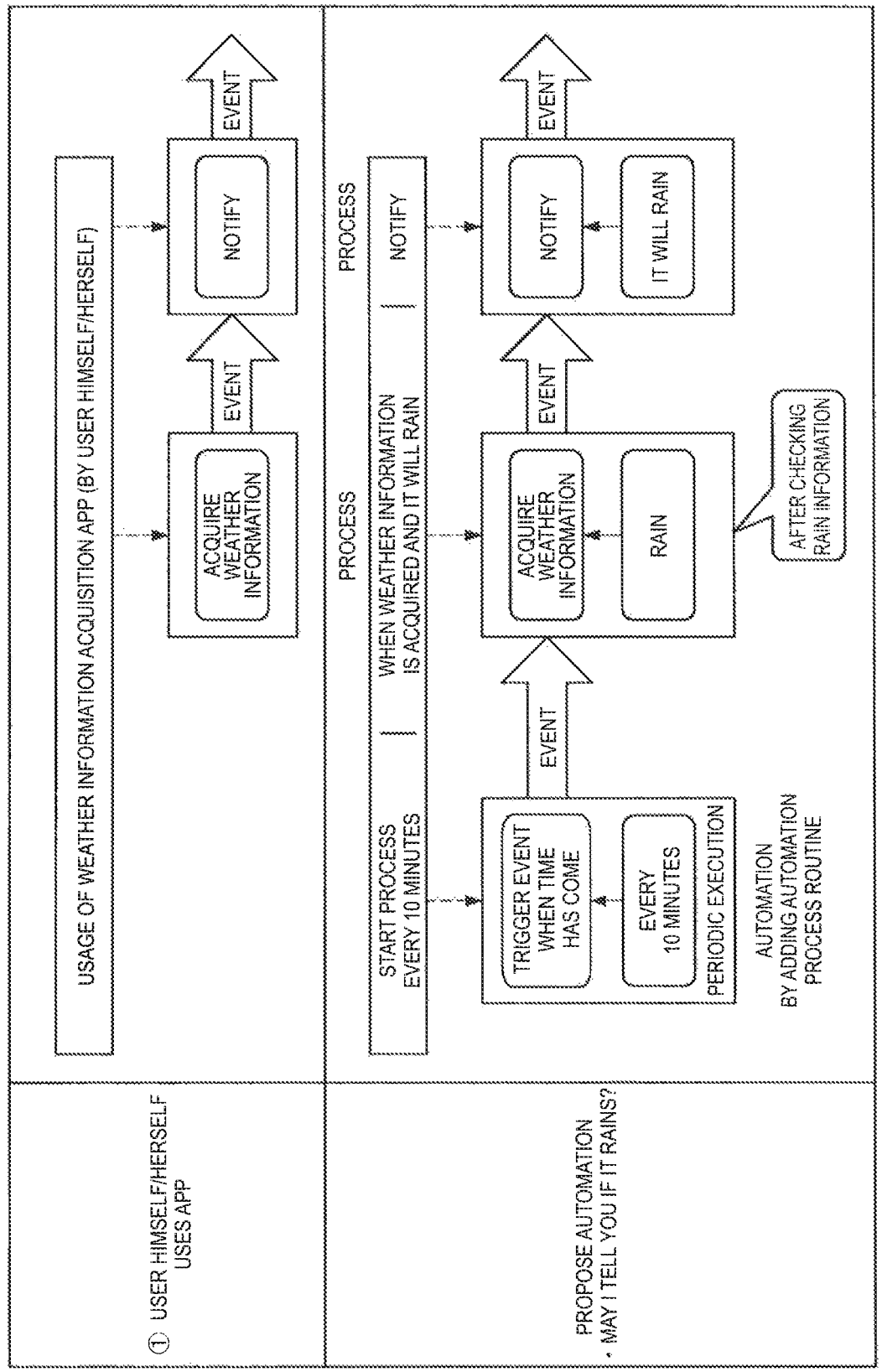
FIG. 19 is a diagram illustrating an image of settings of automation with regard to the seventh pattern.

FIG. 18 is a diagram illustrating a specific example of the seventh pattern. In addition, FIG. 19 is a diagram illustrating an image of settings of automation with regard to the seventh pattern. As illustrated in FIG. 18, when the user U has used (started or finished using) a weather app, the information processing device 10 performs a process "acquire weather information" and a process "notify of weather information" in response to the input information "usage of a weather app".

In addition, as illustrated in FIG. 18, the information processing device 10 proposes automation such as "may I tell you if it rains?" at an acquisition timing of the weather information. When the user inputs an answer "yes, please" indicating that the user accepts the proposal of automation, the information processing device 10 automates a process "tell the user if it rains". Subsequently, the information processing device 10 periodically acquires weather information and automatically notifies the user if it will rain.

With reference to FIG. 19, details thereof will be described. When the user has used (started or finished using) a weather app, the information acquisition unit 121 acquires the input information "usage of the weather app", and the recognition unit 122 recognizes the first program (the process "acquire weather information" and the process "notify of weather information") from the input information "usage of the weather app".

On the other hand, the program generation unit 123 generates the second program from the first program. For example, the program generation unit 123 acquires the first process "acquire weather information" included in the first program as an input element, and acquires a condition "if it rains" related to the input element as a first relevant element. The program generation unit 123 generates the second program by adding the condition "if it rains" to the process "notify of weather information".

In this case, the program generation unit 123 may add an automation process routine to the second program (the process "acquire weather information", the condition "if it rains", and the process "notify of weather information") such that the second program is automatically executed. The automation process routine periodically triggers an event to execute the process "acquire weather information". In the example illustrated in FIG. 19, the event is triggered every 10 minutes. However, the interval of triggering the event is not limited to 10 minutes.

Subsequently, the proposal control unit 124 proposes automation of control of execution of the generated second program to the user U. In the case where an answer that the proposal is accepted is obtained from the user U, the automation process unit 125 automates control of execution of the generated second program. Subsequently, the execution control unit 128 acquires weather information. If the weather information indicates that it rains, the user U is notified of the weather information.

Figure 21:
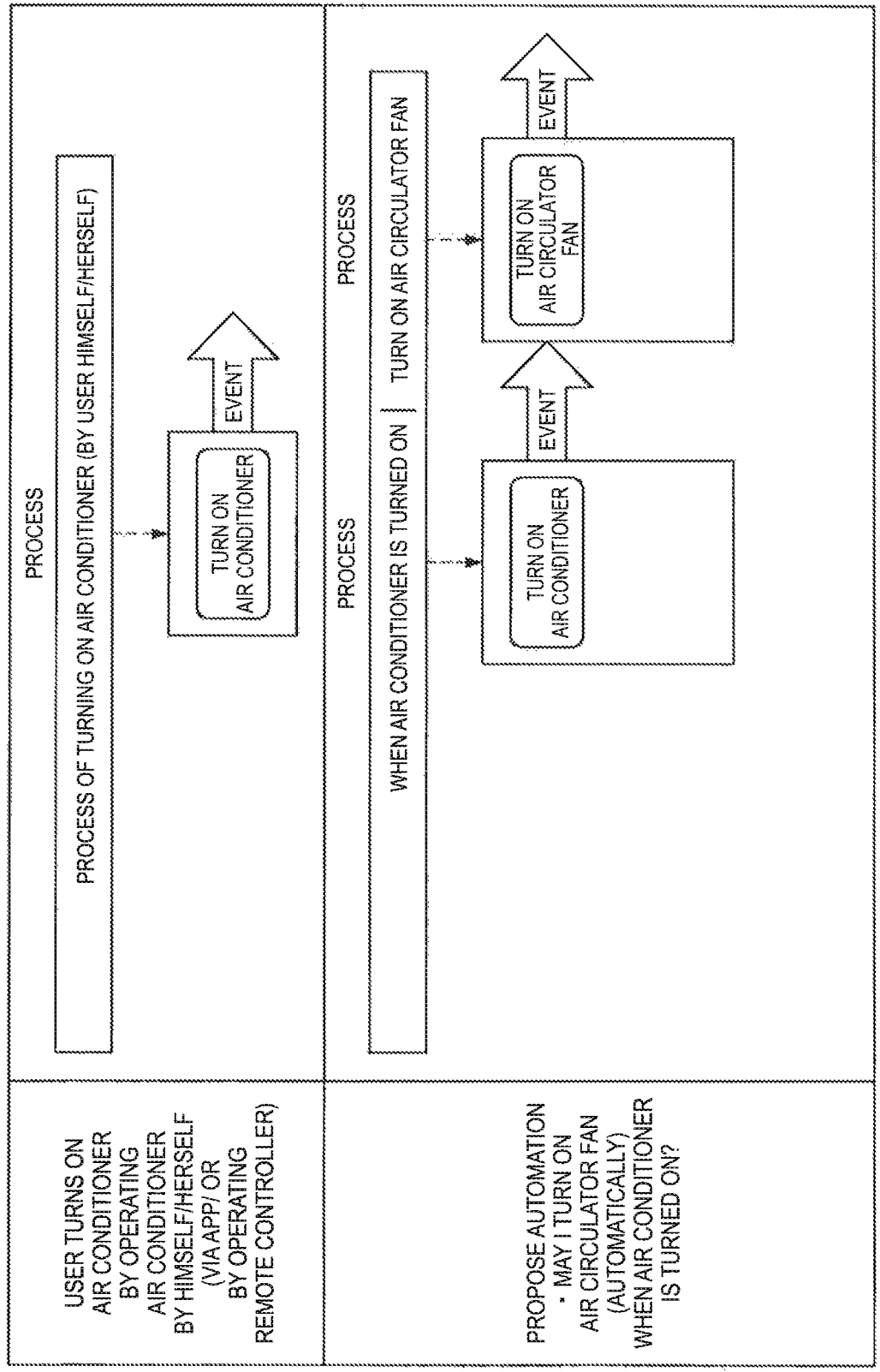
FIG. 21 is a diagram illustrating an image of settings of automation with regard to the eighth pattern.

FIG. 20 is a diagram illustrating a specific example of the eighth pattern. In addition, FIG. 21 is a diagram illustrating an image of settings of automation with regard to the eighth pattern. As illustrated in FIG. 20, when the user U "turns on the air conditioner", the information processing device 10 performs the process "turn on the air conditioner" in response to the input information "turns on the air conditioner".

In addition, as illustrated in FIG. 20, the information processing device 10 proposes automation such as "may I turn on the air circulator fan if the air conditioner is turned on?" at a timing of the process for turning on the air conditioner. When the user inputs an answer "yes, please" indicating that the user accepts the proposal of automation, the information processing device 10 automates a process "turn on the air circulator fan when the air conditioner is turned on". Subsequently, the information processing device 10 turn on the air circulator fan when the air conditioner is turned on (automatically or by user operation).

With reference to FIG. 21, details thereof will be described. When the user inputs the input information "turns on the air conditioner", the information acquisition unit 121 acquires the input information "turns on the air conditioner", and the recognition unit 122 recognizes the first program (the process "turn on the air conditioner") from the input information "turns on the air conditioner".

On the other hand, the program generation unit 123 generates the second program from the first program. For example, the program generation unit 123 acquires the process "turn on the air conditioner" included in the first program as an input element, and acquires the process "turn on the air circulator fan" related to the input element as a first relevant element. The program generation unit 123 uses completion of the process "turn on the air conditioner" as an event, and generates the second program by adding the process "turn on the air circulator fan" as a process to be executed when the event is detected.

Subsequently, the proposal control unit 124 proposes automation of control of execution of the generated second program to the user U. In the case where an answer that the proposal is accepted is obtained from the user U, the automation process unit 125 automates control of execution of the generated second program. Subsequently, the execution control unit 128 turns on the air circulator fan when the air conditioner is turned on.

Figure 22:
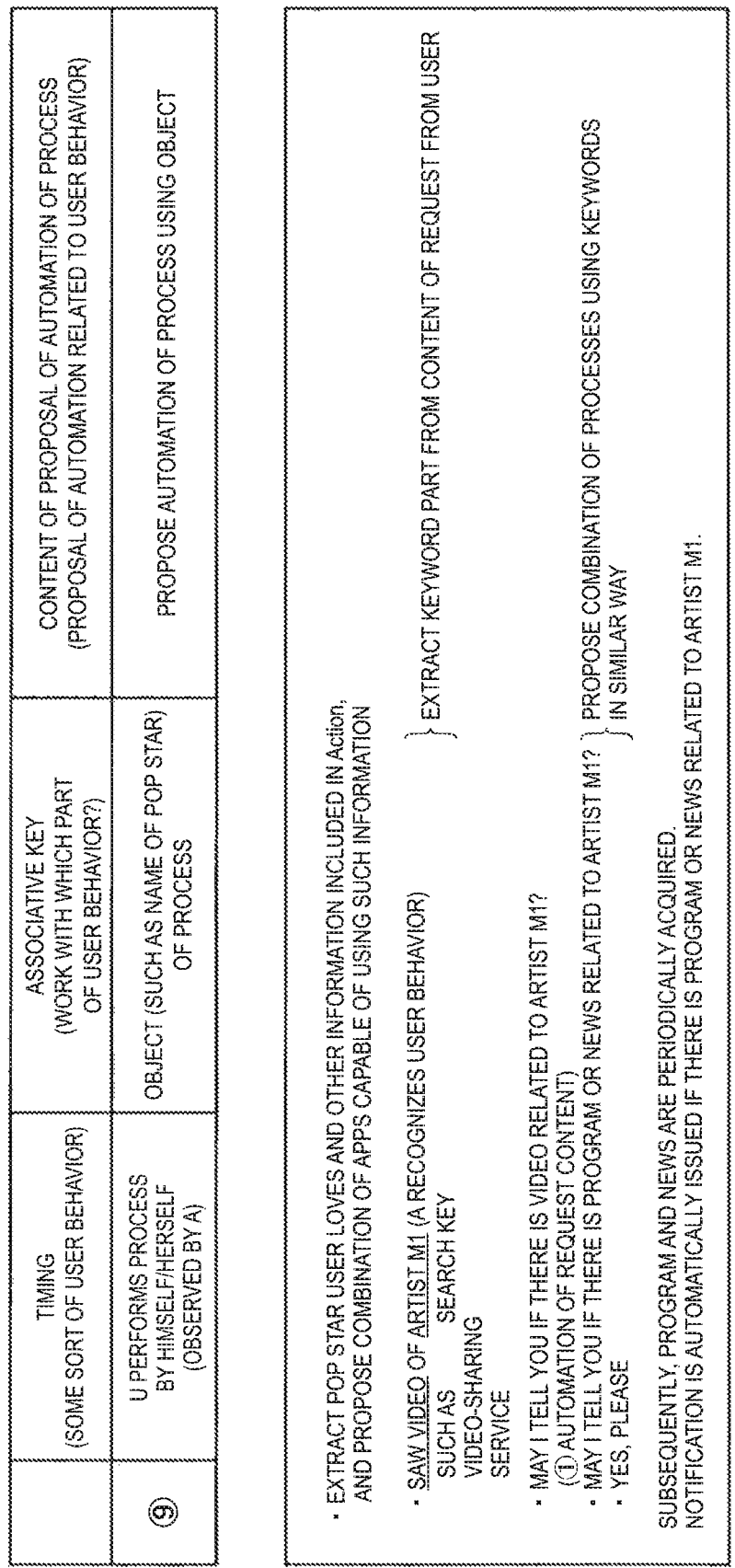
FIG. 22 is a diagram illustrating a specific example of a ninth pattern.
Figure 23:
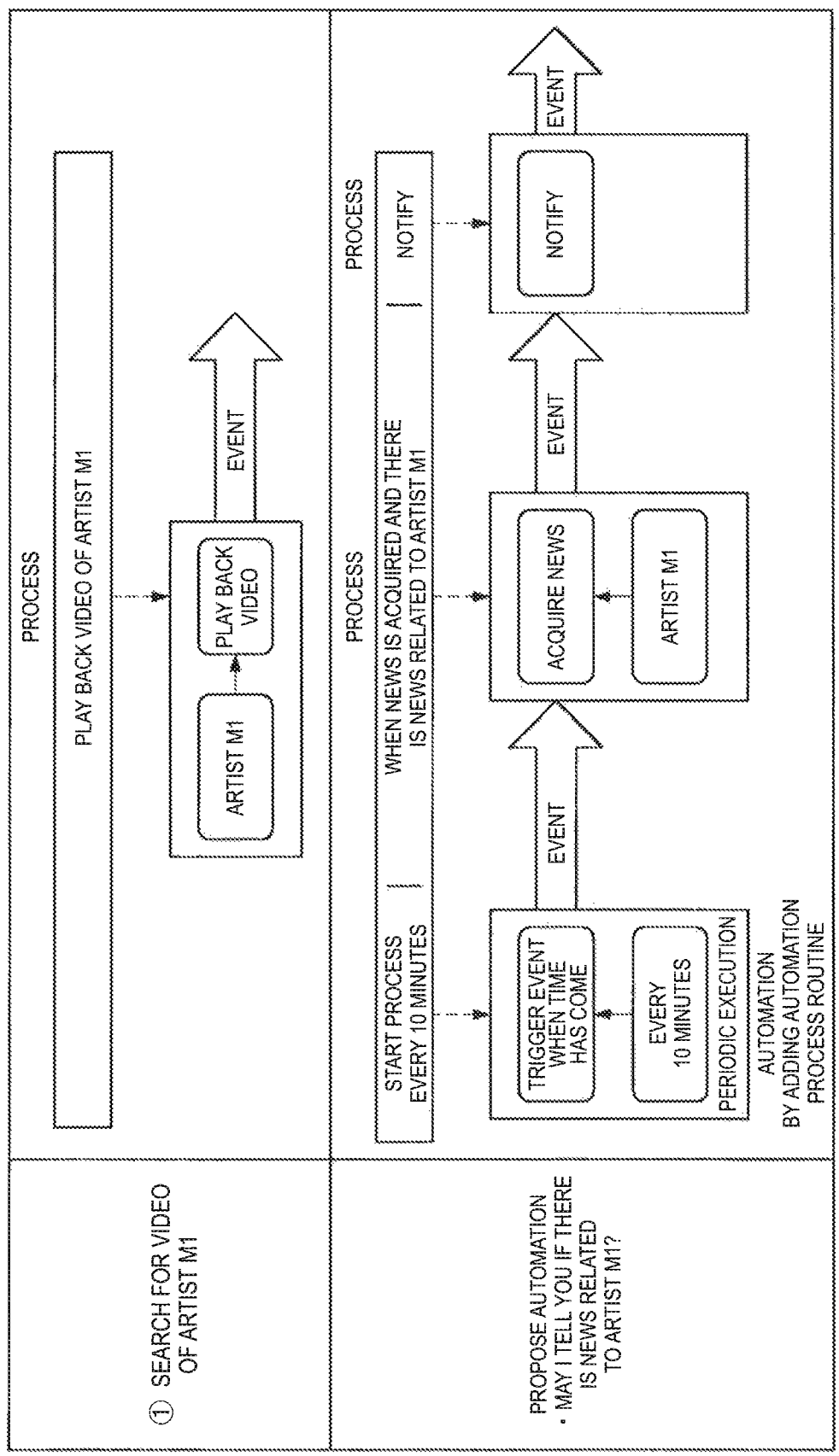
FIG. 23 is a diagram illustrating an image of settings of automation with regard to the ninth pattern.

FIG. 22 is a diagram illustrating a specific example of the ninth pattern. In addition, FIG. 23 is a diagram illustrating an image of settings of automation with regard to the ninth pattern. As illustrated in FIG. 22, when the user U "sees video of the artist M1", the information processing device 10 performs a process "propose to tell the user U if there is video of the artist M1" in response to the input information "saw video of the artist M1".

In addition, as illustrated in FIG. 22, the information processing device 10 proposes automation such as "may I tell you if there is a program or news related to the artist M1?" at a timing of such a proposal. When the user inputs an answer "yes, please" indicating that the user accepts the proposal of automation, the information processing device 10 automates a process "tell the user if there is a program or news related to the artist M1". Subsequently, the user U is automatically notified of the program or news related to the artist M1 if there is the program or news related to the artist M1.

With reference to FIG. 23, details thereof will be described. When the user U inputs input information "saw video of the artist M1", the information acquisition unit 121 acquires the input information "saw video of the artist M1", and the recognition unit 122 recognizes the first program (the process "play back video" of an object "artist M1") from the input information "saw video of the artist M1" by using the above described method.

On the other hand, the program generation unit 123 generates the second program from the first program. For example, the program generation unit 123 acquires the object "artist M1" of the process "play back video" included in the first program as an input element, and acquires the process "acquire news" related to the input element as a second relevant element. The program generation unit 123 generates the second program by replacing the process "play back video" with the process "acquire news", using completion of the process "acquire news" as an event, and adding the process "notify" as a process to be executed when the event is detected.

In this case, the program generation unit 123 may add an automation process routine to the second program (the process "acquire news" and the process "notify") such that the second program is automatically executed. The automation process routine periodically triggers an event to execute the process "acquire news". In the example illustrated in FIG. 11, the event is triggered every 10 minutes. However, the interval of triggering the event is not limited to 10 minutes.

Subsequently, the proposal control unit 124 proposes automation of control of execution of the generated second program to the user U. In the case where an answer that the proposal is accepted is obtained from the user U, the automation process unit 125 automates control of execution of the generated second program. Subsequently, when the news of the artist M1 is acquired, the execution control unit 128 notifies of the news.

FIG. 24 is a diagram illustrating a specific example of the tenth pattern. As illustrated in FIG. 24, the information acquisition unit 121 acquires "frequent usage of the air conditioner at eight" as input information from log information or the like. The recognition unit 122 recognizes the first program (the process "turn on the air conditioner") and a condition "at eight every morning" from the input information "frequent usage of the air conditioner at eight".

On the other hand, the program generation unit 123 generates the second program from the first program. For example, the program generation unit 123 acquires the first process "turn on the air conditioner" included in the first program as an input element, and acquires the recognized condition "at eight every morning" related to the input element as a first relevant element. The program generation unit 123 generates the second program by adding the condition "at eight every morning" to the process "turn on the air conditioner".

Subsequently, the proposal control unit 124 proposes automation of control of execution of the generated second program to the user U. In the case where an answer that the proposal is accepted is obtained from the user U, the automation process unit 125 automates control of execution of the generated second program. Subsequently, the execution control unit 128 causes the air conditioner to be turned on at eight every morning.

FIG. 25 is a diagram illustrating a specific example of the 11th pattern. As illustrated in FIG. 25, the information acquisition unit 121 acquires "the air circulator fan is often used together when the user U uses the air conditioner" as input information from log information or the like. The recognition unit 122 recognizes the first program (the process "turn on the air conditioner"), a condition "when the air conditioner is turned on", and a process "turn on the air circulator fan" from the input information "the air circulator fan is often used together when the user U uses the air conditioner".

On the other hand, the program generation unit 123 generates the second program from the first program. For example, the program generation unit 123 acquires a first process "turn on the air conditioner" included in the first program as an input element, and acquires a process "turn on the air circulator fan" related to the input element as a first relevant element. The program generation unit 123 uses completion of the process "turn on the air conditioner" as an event, and generates the second program by adding the process "turn on the air circulator fan" as a process to be executed when the event is detected.

Subsequently, the proposal control unit 124 proposes automation of control of execution of the generated second program to the user U. In the case where an answer that the proposal is accepted is obtained from the user U, the automation process unit 125 automates control of execution of the generated second program. Subsequently, the execution control unit 128 turns on the air circulator fan when the air conditioner is turned on.

Figure 26:
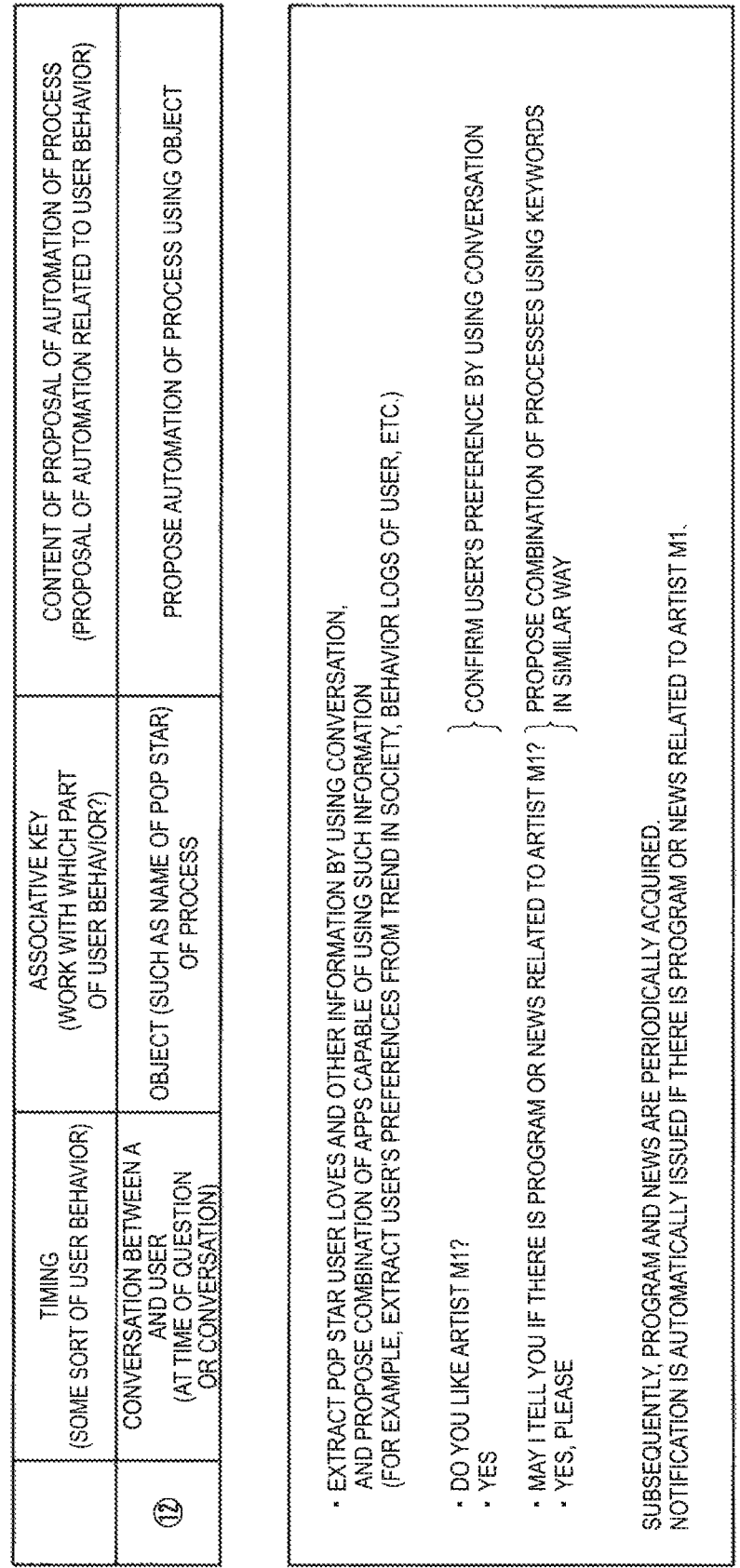
FIG. 26 is a diagram illustrating a specific example of a 12th pattern.

FIG. 26 is a diagram illustrating a specific example of the 12th pattern. As illustrated in FIG. 26, the information acquisition unit 121 acquires conversation or the like between the user U and the information processing device 10, and the recognition unit 122 recognizes the "artist M1" as a preference of the user U from the conversation or the like.

On the other hand, the program generation unit 123 generates the second program. For example, the program generation unit 123 acquires the object "artist M1" as an input element, and acquires the process "acquire news" related to the input element as a first relevant element. The program generation unit 123 generates the second program by adding the process "acquire news", using completion of the process "acquire news" as an event, and adding the process "notify" as a process to be executed when the event is detected.

In this case, the program generation unit 123 may add an automation process routine to the second program (the process "acquire news" and the process "notify") such that the second program is automatically executed. The automation process routine periodically triggers an event to execute the process "acquire news". The interval between triggering of events is not limited.

Subsequently, the proposal control unit 124 proposes automation of control of execution of the generated second program to the user U. In the case where an answer that the proposal is accepted is obtained from the user U, the automation process unit 125 automates control of execution of the generated second program, Subsequently, when the news of the artist M1 is acquired, the execution control unit 128 notifies of the news. Note that, in the specific example of the 12th pattern, the first program may be considered as "notification of acquisition of news". It is only necessary to associate such a first program with an application or a system that can be used by a user and that can be recognized by the information processing device 10.

As described above, automation of control of execution of the second program is proposed to the user U. As described above, in the case where automation is not proposed when the predetermined condition is satisfied, it is possible to recommend information related to the automation to the user U instead of proposal of the automation. For example, the recommendation control unit 126 may recommend information related to the proposal to the user U in the case where the user U performs a predetermined input operation (such as operation of pressing a predetermined recommendation button).

Figure 27:
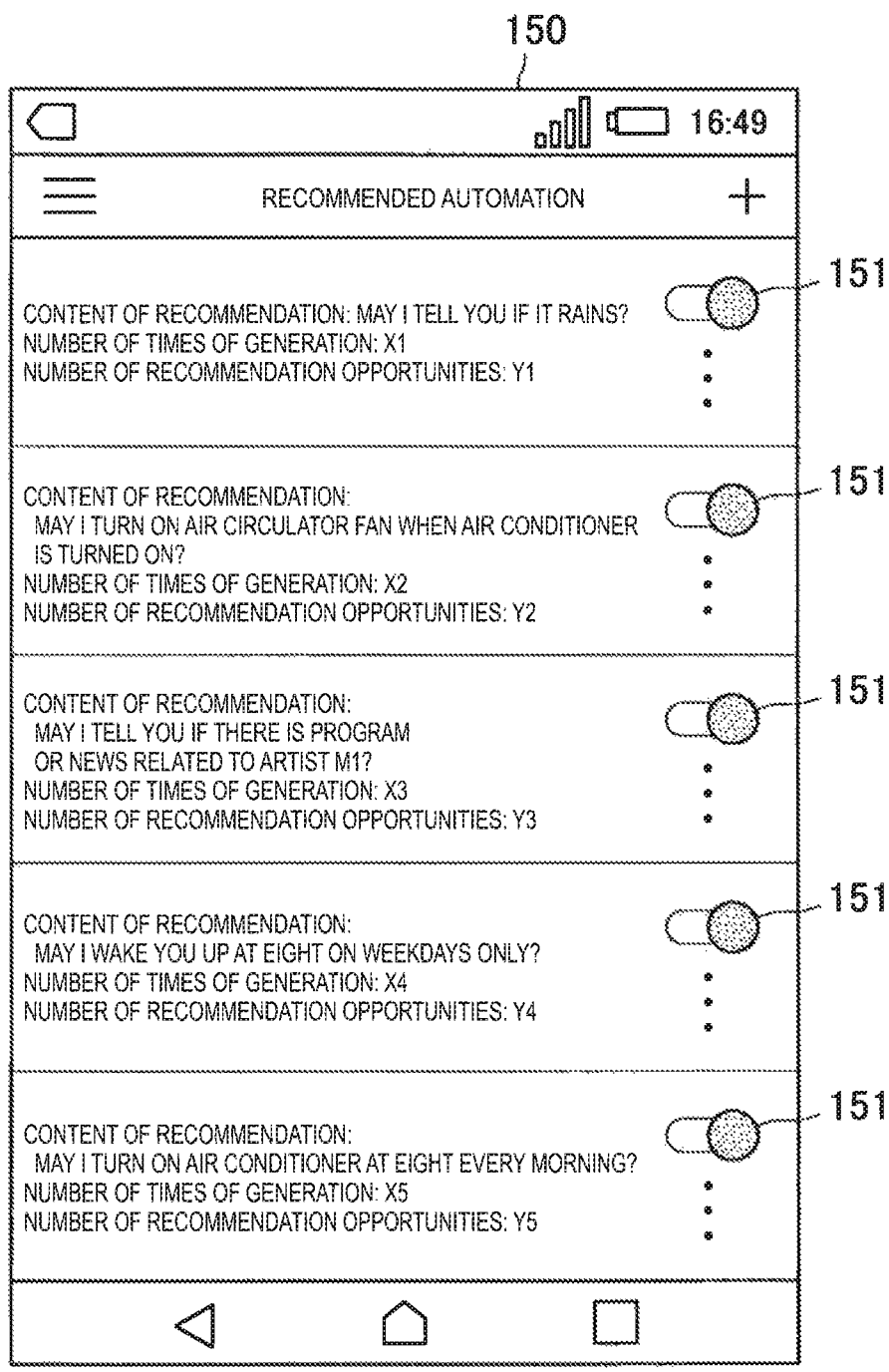
FIG. 27 is a diagram illustrating a display example of information related to proposals.

FIG. 27 is a diagram illustrating a display example of information related to proposals. With reference to FIG. 27, the display unit 150 displays an automation recommendation screen including information related to proposals. With reference to FIG. 27, as the information related to the proposals, "content of the proposals", "the number of times of occurrence of the acquisition timing", and "the number of times of generation of programs" are displayed. Note that, the information related to the proposals may include at least any one of "content of the proposal", "the number of times of occurrence of the acquisition timing", and "the number of times of generation of a program". Automation of each proposal may be switched on/off by operation performed on each operation element 151.

Here, "the number of times of occurrence of the acquisition timing" is the number of times of occurrence of an acquisition timing of input information. In the case where the "content of a proposal" is "please tell the if it rains", "the number of times of occurrence of the acquisition timing" corresponds to the number of times the user U input the inputs input information "please tell me if it rains" to the information processing device 10. "The number of times of generation of a program" is the number of times of generation of the second program from speech from the user U or movement of hands of the user U. Necessity for the user U to automate control of execution of the second program increases as the number of times of generation of a program increases.

In the case where there are a plurality of proposals, priority of each of the proposals (such as proposal order)

may be decided. For example, the recommendation control unit 126 recommends information related to each of the plurality of proposals on the basis of at least any one of the number of times of the corresponding acquisition timing and the number of times of activation of software related to a corresponding relevant element, among the plurality of proposals. For example, the recommendation control unit 126 may give high priority to a proposal with a large number of times of corresponding acquisition timing, or may give high priority to a proposal with a large (or small) number of times of activation of software related to a corresponding relevant element.

Figure 28:
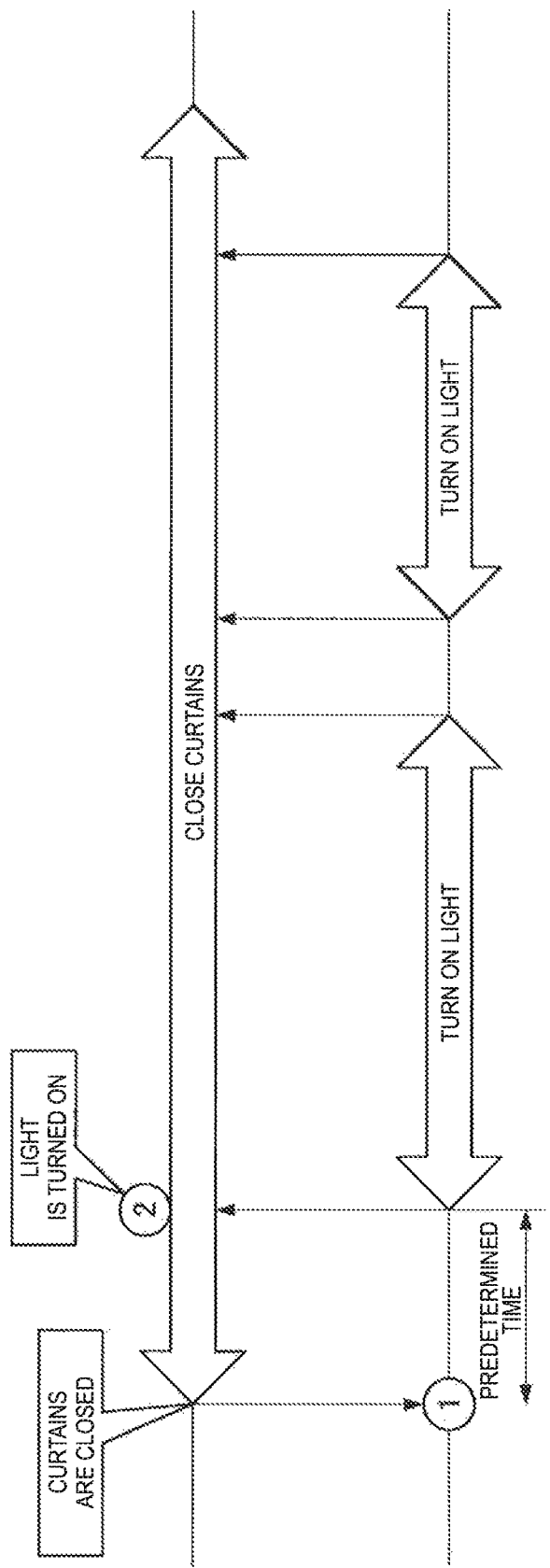
FIG. 28 is a diagram illustrating an example in which a correspondence relation between an event and a process is recognized on the basis of a log analysis result (result of analyzing behavior of a user U).

FIG. 28 is a diagram illustrating an example in which a correspondence relation between an event and a process is recognized on the basis of a log analysis result (result of analyzing behavior of a user U). FIG. 28 illustrates a case where a light is turned on within a predetermined time after a user closes curtains. In this case, the recognition unit 122 may record a correspondence relation between the event "closes curtains" and the process "turn on the light" on the storage unit 130 as a program. Accordingly, the light automatically turns on when the event "closes curtains" occurs.

In addition to or instead of whether the process is performed within the predetermined time, frequency of behavior of the user may be considered. In other words, in the case where a predetermined frequency or more of the process performed after occurrence of the event is detected, the recognition unit 122 may record a correspondence relation between the event and the process on the storage unit 130 as a program. In such a case, it is also possible to reduce the user's burden to register the program.

At this time, it is preferable for the recognition unit 122 to check with the user whether to perform a process with regard to occurrence of an event on the basis of the recorded program. The checking with the user may be made in any way. For example, the user may be asked a question through voice output or display, and an answer is acquired from the user through voice input or image capturing.

Note that, the user may be asked a question about whether to perform the process with regard to occurrence of an event in any case where a program is recorded on the storage unit 130. Here, with regard to check with the user, the question may be asked to the user through voice output or display in any way. For example, the recognition unit 122 may causes a text "may I turn on the light after the curtains are closed?" to be displayed or output in voice in the case where the storage unit 130 records the correspondence relation between the event of closing the curtains and the process of turning on the light as a program.

In addition, "curtain close" is a paraphrase of "close curtain", and "switch on the light" and "light on" are paraphrases of "turn on light". Therefore, in the case where past speech content of the user is recorded, the recognition unit 122 may select an expression that has been most frequently spoken by the user. Alternatively, the recognition unit 122 may select an expression that has been spoken by the user, in the case where past speech content of the user is recorded.

In the case where the recognition unit 122 records the correspondence relation between the event and the process as a program on the storage unit 130, occurrence of the event may be detected from completion of a process whose execution is controlled by the execution control unit 128. For example, when execution of the process of closing curtains on the basis of speech "please close the curtains" from a user is controlled by the execution control unit 128 and an event of closing the curtains occurs, for example, the execution control unit 128 may control execution of a process of turning on the light in response to occurrence of the event.

Alternatively, the occurrence of the event may be detected from completion of a process directly executed through hand motion of the user. For example, when curtains are closed directly through hand motion of the user and an event of closing the curtains occurs, the execution control unit 128 may controls execution of a process of turning on the light in response to occurrence of the event. As described above, various kinds of patterns are assumed as event occurrence patterns. Therefore, it can be said that there is a high degree of freedom for occurrence of events.

Figure 29:
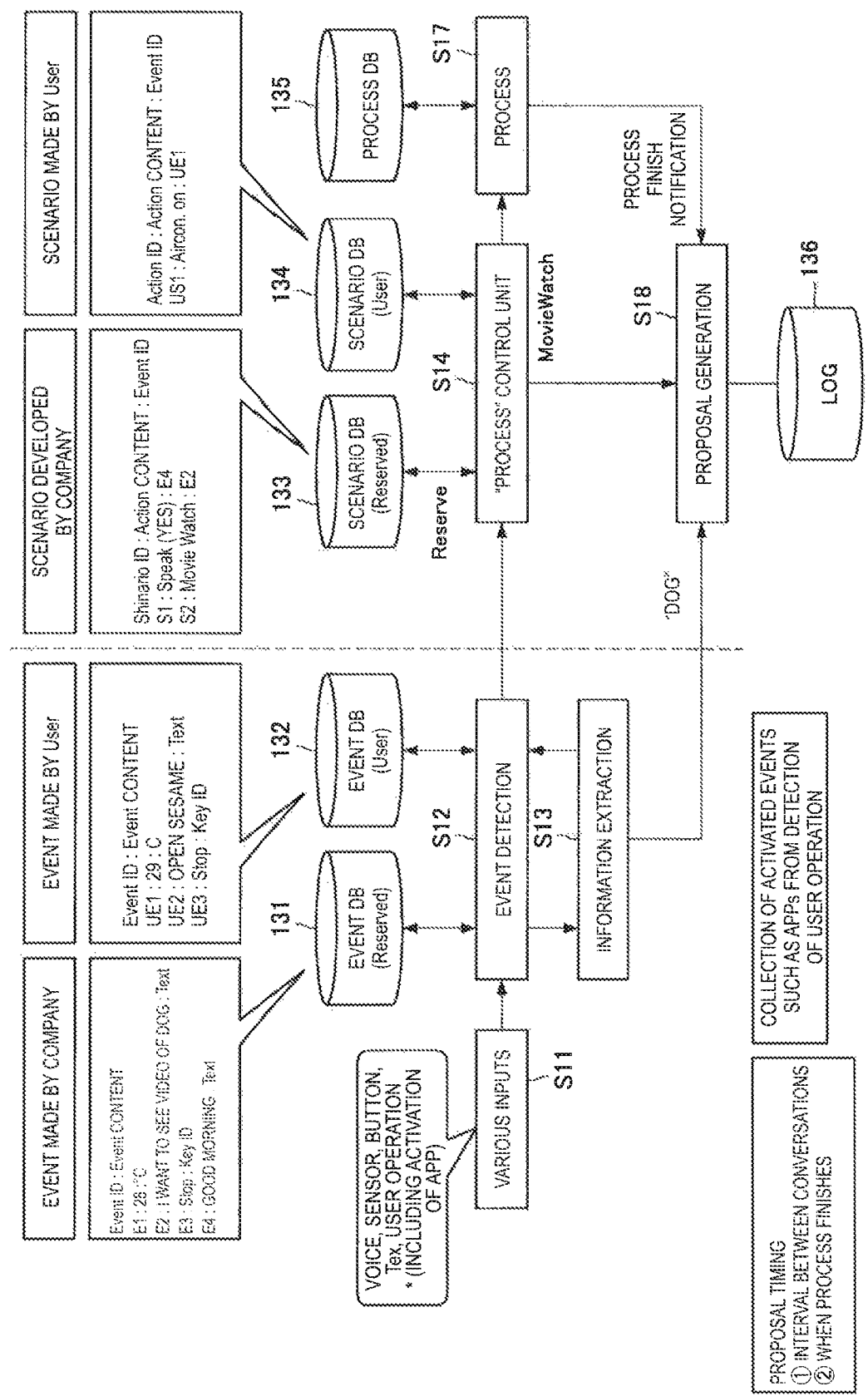
FIG. 29 is a diagram illustrating a first example of proposal generation operation at a time when an event occurs.

Next, an example of proposal generation operation at a time when an event occurs will be described. FIG. 29 is a diagram illustrating a first example of proposal generation operation at a time when an event occurs. As illustrated in FIG. 29, various kinds of input (such as voice input, detection performed by a sensor, pressing on a button, and text input) are performed (S11). In this case, data in which an event ID and event content are associated with each other is recorded on an event DB (reserved) 131 (event made by company). On the other hand, data in which an event ID and event content are associated with each other is also recorded on an event DB (user) 132 (event made by user).

When occurrence of an event is detected (S12), the control target equipment 20 extracts information from the event (for example, in the case of voice "I want to see video of a dog", the control target equipment 20 extracts an object "dog" from the voice) (S13), and acquires an event ID corresponding to the event content from the event DB (reserved) 131 or the event DB (user) 132. In this case, data in which a sinario ID, action content, and an event ID are associated with each other is recorded on an scenario DB (reserved) 133 (scenario developed by company). On the other hand, data in which an action ID, action content, and an event ID are associated with each other is recorded on an scenario DB (user) 134 (scenario developed by user).

Next, the control target equipment 20 acquires action content corresponding to the acquired event ID from the scenario DB (reserved) 133 or the scenario DB (user) 134. The control target equipment 20 executes a process (for example, plays back video) (S14).

Specifically, data in which the action content and the process are associated with each other is recorded on the process DB 135. The control target equipment 20 acquires a process corresponding to the acquired action content from the process DB 135, and executes the process on the basis of the acquired process (S17). In addition, when receiving a notification of execution of the process, the control target equipment 20 generates content of a proposal of automation on the basis of the process (such as playback of video) and the object "dog" (S18). To generate the content of the proposal of automation, it is possible to refer to a behavior log (LOG 136) of the user.

Figure 30:
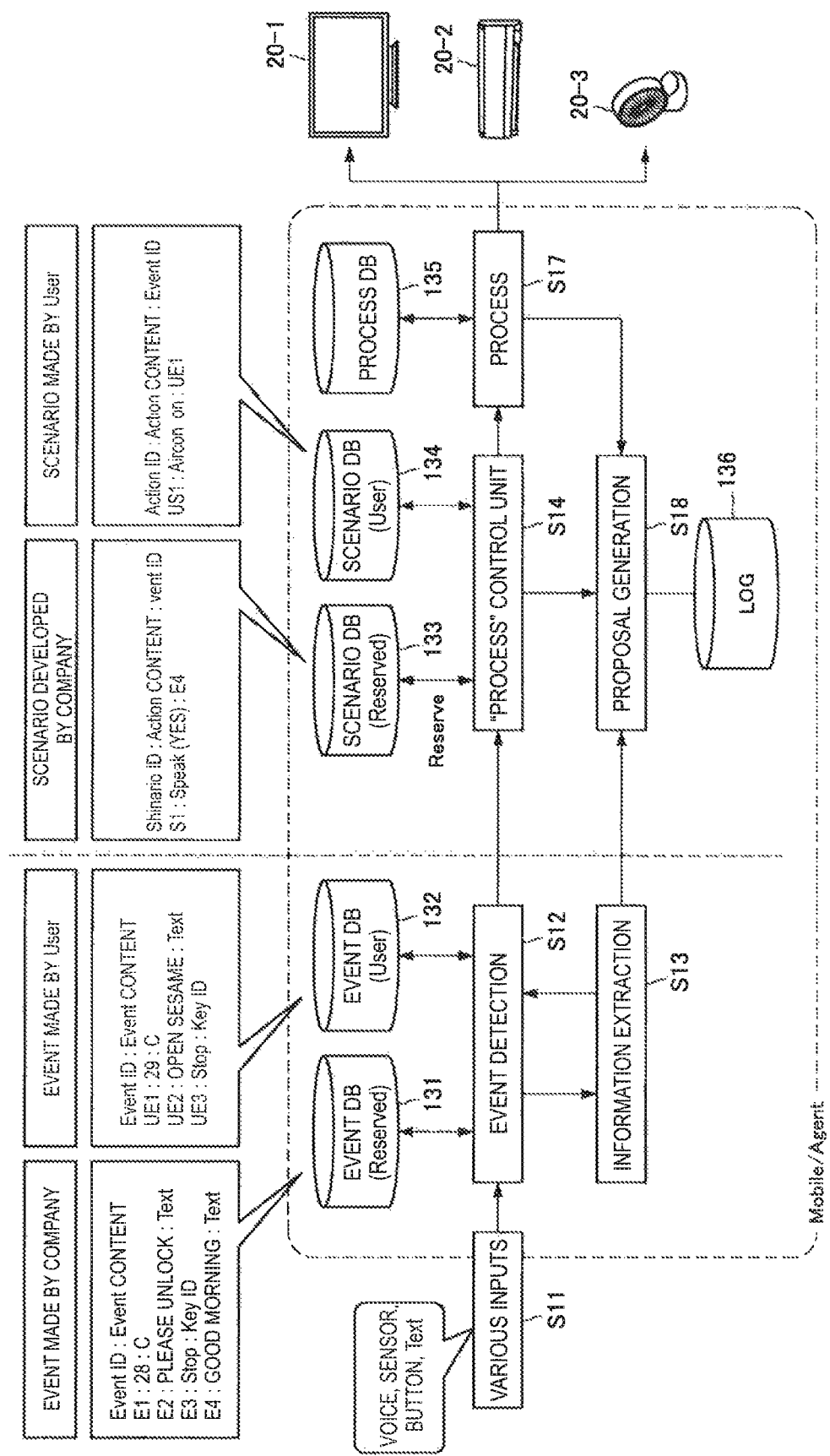
FIG. 30 is a diagram illustrating a second example of the operation at the time when an event occurs.

Although FIG. 29 illustrates the example in which the control target equipment 20 executes a process, it is also possible for the information processing device 10 (agent) to have the function of controlling execution of a process. FIG. 30 is a diagram illustrating a second example of the operation at the time of event generation. As illustrated in FIG. 30, the event detection unit 127 of the agent may perform event detection (S12), the execution control unit 128 of the agent may perform process control (S14) and a process (S17), and the program generation unit 123 of the agent may perform proposal generation (S18). In this case, the process whose execution is controlled by the agent may be performed by the control target equipment 20 (such as any piece of control target equipment 20-1 to 20-3).

Figure 31:
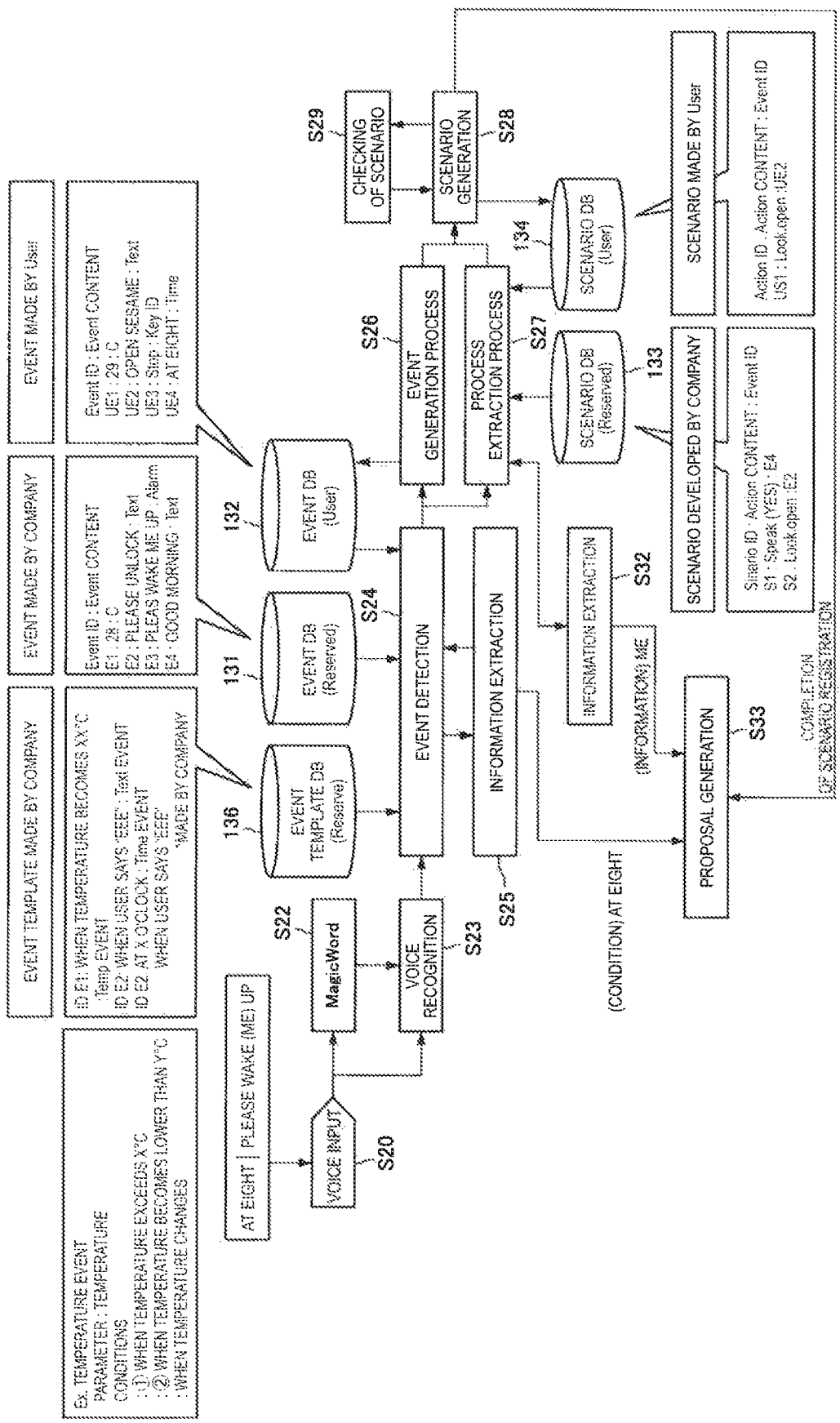
FIG. 31 is a diagram illustrating an example of proposal generation operation at a time of program registration.

Next, an example of proposal generation operation at a time of program registration will be described. FIG. 31 is a diagram illustrating an example of proposal generation operation at a time of program registration. As illustrated in FIG. 31, voice (such as "please wake me up at eight") is input (S20). Next, the recognition unit 122 performs magic word recognition and voice recognition processes on the input voice, and generates text data. In this case, characters (such as "please wake rue up at eight") may be input instead of the input voice.

In this case, data in which an event ID and a speaking style are associated with each other is recorded on an event template DB (reserved) 136 (event template made by company). The recognition unit 122 acquires a speaking style corresponding to the text data from the event template DB (reserve) 136, and acquires event content corresponding to the event ID of the speaking style from the event DB (reserve) 131 (S24). The recognition unit 122 acquires a condition "at eight" from event content (S25).

In the case where the event content is not acquired from the event DB (reserve) 131, the recognition unit 122 acquires an event ID corresponding to an event extracted from the text data, from the event DB (user) 132 (S26). In addition, from the scenario DB (reserved) 133 or a scenario DB (user) 134, the recognition unit 122 extract action content corresponding to a process extracted from the text data (S27). The recognition unit 122 acquires an object (me) from the action content (S32).

Next, the recognition unit 122 generates a scenario (program) by associating the acquired event ID with the action content (S28), and checks with the user regarding the scenario (S29). Next, in the case where the user input an instruction to register the scenario, the recognition unit 122 records the scenario on the scenario DB (user) 134. When the registration of the scenario completes, the program generation unit 123 generates content of the proposal of automation on the basis of the condition "at eight" and the object "me" (S33). The object "me" does not have to be used for the generation of the content of the proposal.

The details of the functions of the information processing device 10 according to the embodiment have been described above.

[1.4. Hardware Configuration Example]

Figure 32:
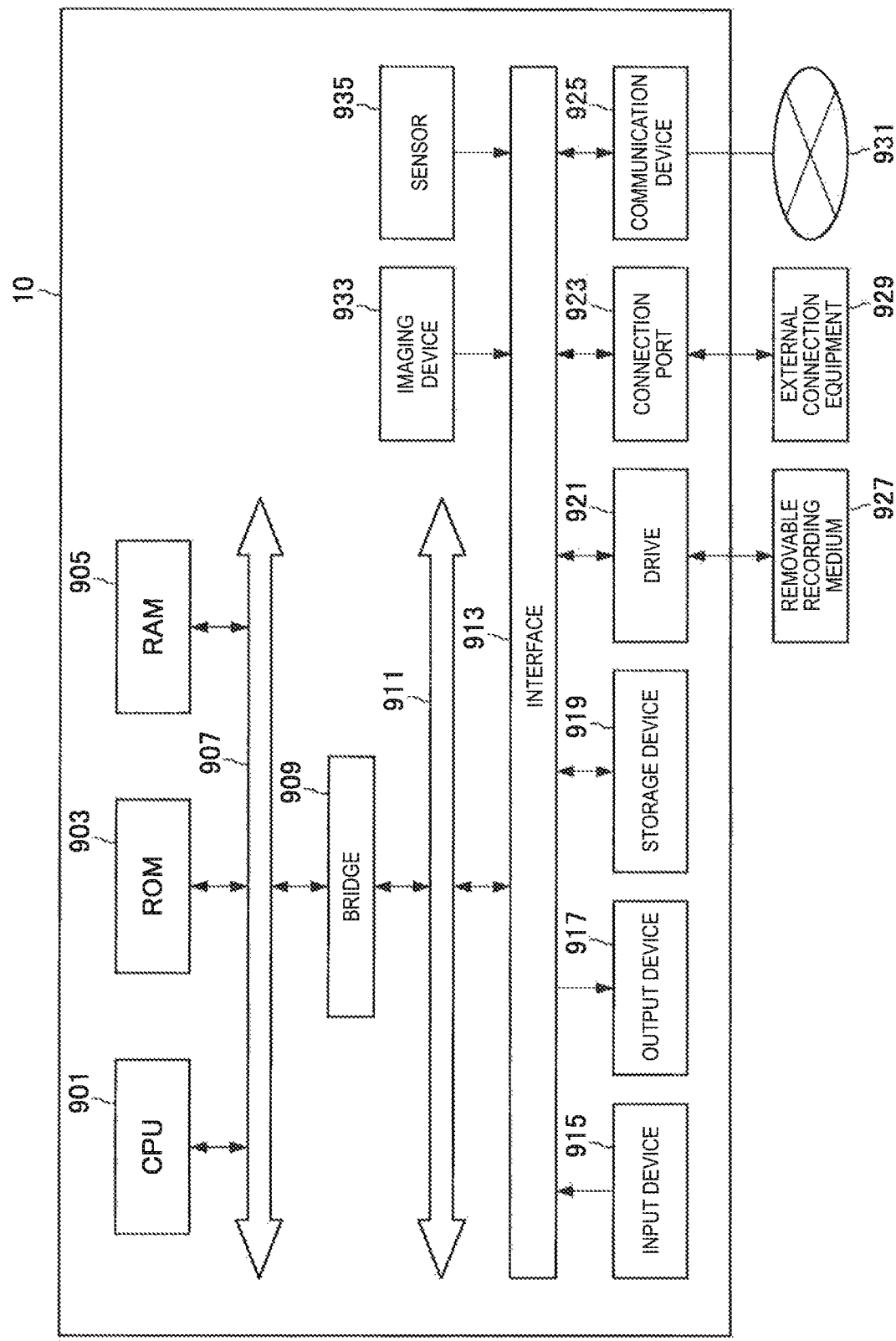
FIG. 32 is a block diagram illustrating a hardware configuration example of the information processing device.

Next, with reference to FIG. 32, a hardware configuration of the information processing device 10 according to the embodiment of the present disclosure will be described. FIG. 32 is a block diagram illustrating the hardware configuration example of the information processing device 10 according to the embodiment of the present disclosure.

As illustrated in FIG. 32, the information processing device 10 includes a central processing unit (CPU) 901, read only memory (ROM) 903, and random access memory (RAM) 905. In addition, the information processing device 10 may include a host bus 907, a bridge 909, an external bus 911, an interface 913, an input device 915, an output device 917, a storage device 919, a drive 921, a connection port 923, and a communication device 925. Moreover, the information processing device 10 may include an imaging device 933 and a sensor 935, as necessary. The information processing device 10 may include a processing circuit such as a digital signal processor (DSP) or an application specific integrated circuit (ASIC), alternatively or in addition to the CPU 901.

The CPU 901 serves as an arithmetic processing device and a control device, and controls the overall operation or a part of the operation of the information processing device 10 according to various programs recorded in the ROM 903, the RAM 905, the storage device 919, or a removable recording medium 927. The ROM 903 stores programs, operation parameters, and the like used by the CPU 901, The RAM 905 temporarily stores programs used when the CPU 901 is executed, and parameters that change as appropriate when executing such programs. The CPU 901, the ROM 903, and the RAM 905 are connected with each other via the host bus 907 configured from an internal bus such as a CPU bus. In addition, the host bus 907 is connected to the external bus 911 such as a Peripheral Component Interconnect/Interface (PCI) bus via the bridge 909.

The input device 915 is a device operated by a user such as a mouse, a keyboard, a touchscreen, a button, a switch, and a lever. The input device 915 may include a microphone configured to detect voice of users. The input device 915 may be a remote control device that uses, for example, infrared radiation and another type of radio waves. Alternatively, the input device 915 may be external connection equipment 929 such as a mobile phone that corresponds to an operation of the information processing device 10. The input device 915 includes an input control circuit that generates input signals on the basis of information which is input by a user to output the generated input signals to the CPU 901. A user inputs various types of data and indicates a processing operation to the information processing device 10 by operating the input device 915. In addition, the imaging device 933 (to be described later) may function as the input device by capturing an image of movement of hands of a user or capturing a finger of a user. In this case, a pointing position may be decided in accordance with the movement of the hands or a direction of the finger.

The output device 917 includes a device that can visually or audibly report acquired information to a user. The output device 917 may be, for example, a display device such as a liquid crystal display (LCD), a plasma display panel (PDP), an organic electro-luminescence (EL) display, a projector, or a hologram display device, an audio output device such as a speaker or a headphone, or a printer. The output device 917 outputs a result obtained through a process performed by the information processing device 10, in the form of text or video such as an image, or sounds such as voice and audio sounds. In addition, the output device 917 may include a light or the like to light the surroundings.

The storage device 919 is a device for data storage that is an example of the storage unit of the information processing device 10. The storage device 919 includes, for example, a magnetic storage unit device such as a hard disk drive (HDD), a semiconductor storage device, an optical storage device, or a magneto-optical storage device. The storage unit 919 stores therein various data and programs executed by the CPU 901, and various data acquired from an outside.

The drive 921 is a reader/writer for the removable recording medium 927 such as a magnetic disk, an optical disc, a magneto-optical disk, and a semiconductor memory, and built in or externally attached to the information processing device 10. The drive 921 reads out information recorded on the mounted removable recording medium 927, and outputs the information to the RAM 905. The drive 921 writes the record into the mounted removable recording medium 927.

The connection port 923 is a port used to directly connect equipment to the information processing device 10. The connection port 923 may be a USB (Universal Serial Bus) port, an IEEE1394 port, and a Small Computer System Interface (SCSI) port, or the like. In addition, the connection port 923 may be an RS-232C port, an optical audio terminal, an HDMI (registered trademark) (High-Definition Multimedia Interface) port, and so on. The connection of the external connection equipment 929 to the connection port 923 makes it possible to exchange various kinds of data between the information processing device 10 and the external connection equipment 929.

The communication device 925 is a communication interface including, for example, a communication device for connection to the communication network 931. The communication device 925 may be, for example, a wired or wireless local area network (LAN), Bluetooth (registered trademark), or a communication card for a wireless USB (WUSB). The communication device 925 may also be, for example, a router for optical communication, a router for asymmetric digital subscriber line (ADSL), or a modem for various types of communication. For example, the communication device 925 transmits and receives signals in the Internet or transmits signals to and receives signals from another communication device by using a predetermined protocol such as TCP/IP. The communication network 931 to which the communication device 925 connects is a network established through wired or wireless connection. The communication network 931 is, for example, the Internet, a home LAN, infrared communication, radio communication, or satellite communication.

The imaging device 933 is a device that captures images of a real space by using an image sensor such as a charge coupled device (CCD) or a complementary metal oxide semiconductor (CMOS), and various members such as a lens for controlling image formation of a subject image onto the image sensor, and generates the captured images. The imaging device 933 may capture a still image or a moving image.

The sensor 935 is various sensors such as a ranging sensor, an acceleration sensor, a gyro sensor, a geomagnetic sensor, an optical sensor, and a sound sensor. The sensor 935 acquires information regarding a state of the information processing device 10 such as a posture of a housing of the information processing device 10, and information regarding an environment surrounding the information processing device 10 such as luminous intensity and noise around the information processing device 10. The sensor 935 may include a global positioning system (GPS) sensor that receives UPS signals to measure latitude, longitude, and altitude of the device.

2. Conclusion

As described above, according to the embodiment of the present disclosure, there is provided the information processing device including: the information acquisition unit configured to acquire input information of a user; and the proposal control unit configured to propose automation of control related to the input information at an acquisition timing of the input information. Here, the proposal control unit is configured to propose automation of control of execution of a second program obtained by performing, on a first program, at least one of addition of a first relevant element related to an input element included in the first program recognized from the input information, and replacement of the input element with a second relevant element related to the input element.

According to such configurations, it is possible to provide the technology capable of proposing automation of execution of programs at a timing convenient for a user.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In addition, it is also possible to create a program for causing hardware such as CPU, ROM, and RAM, which are embedded in a computer, to execute functions equivalent to the functions of the control unit 120. Moreover, it may be possible to provide a computer-readable recording medium having the program recorded thereon.

Note that, the positions of the respective structural elements are not specifically limited as long as operation of the information processing device 10 is achieved. As a specific example, the recognition unit 122, the program generation unit 123, and the like may be provided in a server (not illustrated) connected via the communication network 931. In other words, the information processing device 10 may be implemented by using so-called cloud computing. In this case, the information processing device 10 corresponds to a client connected with the server via the communication network 931.

The recognition unit 122, the program generation unit 123, and the like may be installed in different servers. Alternatively, one of the recognition unit 122 and the program generation unit 123 may be installed in the server, and the other of the recognition unit 122 and the program generation unit 123 may be installed in hardware of a client. Alternatively, the information processing device 10 may be implemented by the recognition unit 122 and the program generation unit 123 that are installed in the server, and the information processing device 10 does not have to include the other structural elements.

Note that, the embodiment also includes the information processing device 10 from which the structural elements other than the proposal control unit 124 are omitted. In other words, it is only necessary for the proposal control unit 124 to propose automation of control related to the input information at an acquisition timing of the input information.

The input information of the user is not limited to information directly related to the user. Information indirectly input by a subject related to the user may also be considered as input information of the user. Specifically, it is assumed that, in the case where environmental information indicating that cat food for a cat owned by the user have run out is acquired as input information, automation of replenishment of the cat food is proposed to the user. Alternatively, it is assumed that, in the case where environmental information indicating that a houseplant grown by the user is dying is acquired as input information, automation of watering of the plant is proposed to the user. Needless to say, it is also possible to assume a person associated with the user as a subject. Examples of the person includes, family members living in the same house and friends. In other words, the number of the users may be two or more in the present disclosure. As a part of the users, a subject other than human may also be assumed.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

an information acquisition unit configured to acquire input information of a user; and a proposal control unit configured to propose automation of control related to the input information at an acquisition timing of the input information.

in which the proposal control unit is configured to propose automation of control of execution of a second program obtained by performing, on a first program, at least one of addition of a first relevant element related to an input element included in the first program recognized from the input information, and replacement of the input element with a second relevant element related to the input element.

(2)

The information processing device according to (1), in which the acquisition timing is a timing based on at least one of context during acquiring the input information, context before acquiring the input information, and context after acquiring the input information.

(3)

The information processing device according to (1) or (2), in which the input element includes a first process included in the first program.

(4)

The information processing device according to (3), in which the first relevant element includes at least one of a condition related to the first process and a second process related to the first process.

(5)

The information processing device according to any one of (1) to (4), in which the input element includes an object of a third process included in the first program.

(6)

The information processing device according to (5), in which the second relevant element includes a fourth process related to the object of the third process.

(7)

The information processing device according to any one of (1) to (6), including an automation process unit configured to automate control of execution of the second program in the case where an answer that a proposal of the automation is accepted is obtained from the user.

(8)

The information processing device according to (7), including an execution control unit configured to control execution of the second program in accordance with the automation.

(9)

The information processing device according to (7) or (8), in which the proposal control unit does not propose the automation in the case where a predetermined condition is satisfied.

(10)

The information processing device according to (9), in which the predetermined condition includes at least one of a condition that an answer that a proposal of temporal execution of control related to the input information is accepted is obtained from the user more than a first number of times, and a condition that the temporal execution of control related to the input information is proposed more than a second number of times.

(11)

The information processing device according to any one of (1) to (10), in which, in the case where there are a plurality of candidates for a relevant element related to the input element, the proposal control unit proposes the automation on the basis of the number of times of activation of a piece of software related to each of the plurality of candidates.

(12)

The information processing device according to any one of (1) to (11), including a recommendation control unit configured to recommend information related to the proposal to the user in the case where the user has performed predetermined input operation.

(13)

The information processing device according to (12), in which the information related to the proposal includes at least any one of content of the proposal, the number of times of occurrence of the acquisition timing, and the number of times of generation of the second program.

(14)

The information processing device according to (12) or (13), in which, in the case where there are a plurality of proposals, the recommendation control unit recommends information related to each of the plurality of proposals on the basis of at least any one of the number of times of the corresponding acquisition timing and the number of times of activation of a piece of software related to a corresponding relevant element, among the plurality of proposals.

(15)

The information processing device according to any one of (1) to (14), in which the input information includes at least any one of input information from application software, input information from system software, voice of a user, an image related to behavior of the user information input through equipment operated by the user, and operation of the equipment operated by the user.

(16)

The information processing device according to any one of (1) to (15), in which the first program and the second program include programs related to pieces of software independent from each other.

(17)

The information processing device according to any one of (1) to (15), in which the first program and the second program include programs related to an identical piece of software.

(18)

in which the software includes at least any one of system software and application software.

(19)

An information processing method including:

acquiring input information of a user; and proposing, by a processor, automation of control related to the input information at an acquisition timing of the input information, in which the information processing method further includes proposing automation of control of execution of a second program obtained by performing, on a first program, at least one of addition of a first relevant element related to an input element included in the first program recognized from the input information, and replacement of the input element with a second relevant element related to the input element.

(20)

A program causing a computer to function as an information processing device including:
    an information acquisition unit configured to acquire input information of a user; and
    a proposal control unit configured to propose automation of control related to the input information at an acquisition timing of the input information,
    in which the proposal control unit is configured to propose automation of control of execution of a second program obtained by performing, on a first program, at least one of addition of a first relevant element related to an input element included in the first program recognized from the input information, and replacement of the input element with a second relevant element related to the input element.

REFERENCE SIGNS LIST 10 information processing device
20 control target equipment
30 server device
111 sound output unit
113 sound collection unit
114 imaging unit
115 distance detection unit
121 information acquisition unit
122 recognition unit
123 program generation unit
124 proposal control unit
125 automation process unit
126 recommendation control unit
127 event detection unit
128 execution control unit
120 control unit
130 storage unit
140 communication unit
150 display unit

The invention claimed is:

1. An information processing device comprising:
    circuitry configured to
        acquire input information of a user,
        execute, at an acquisition timing of the input information and based on the input information, a first program recognized from the input information, and
        propose automation of control of execution of a second program executed automatically based on the input information, the second program obtained by performing, on the first program, at least one of addition of a first relevant element related to an input element included in the first program to the input element or replacement of the input element with a second relevant element related to the input element, a timing at which automation of control is proposed is based on the acquisition timing of the input information.

2. The information processing device according to claim 1,
    wherein the acquisition timing includes a timing based on at least one of context during acquiring the input information, context before acquiring the input information, or context after acquiring the input information.

3. The information processing device according to claim 1,
    wherein the input element includes a first process included in the first program.

4. The information processing device according to claim 3,
    wherein the first relevant element includes at least one of a condition related to the first process or a second process related to the first process.

5. The information processing device according to claim 1,
    wherein the input element includes an object of a third process included in the first program.

6. The information processing device according to claim 5,
    wherein the second relevant element includes a fourth process related to the object of the third process.

7. The information processing device according to claim 1, wherein the circuitry is further configured to
    automate control of execution of the second program in a case where an answer that the proposal of the automation is accepted is obtained from the user.

8. The information processing device according to claim 7, wherein the circuitry is further configured to
    control execution of the second program in accordance with the automation.

9. The information processing device according to claim 7,
    wherein the automation is not proposed in a case where a predetermined condition is satisfied.

10. The information processing device according to claim 9,
    wherein the predetermined condition includes at least one of a condition that an answer that a proposal of temporal execution of control related to the input information is accepted is obtained from the user more than a first number of times, or a condition that the temporal execution of control related to the input information is proposed more than a second number of times.

11. The information processing device according to claim 1,
    wherein, in a case where there are a plurality of candidates for a relevant element related to the input element, the circuitry is further configured to
    propose the automation on the basis of a number of times of activation of a piece of software related to each candidate of the plurality of candidates.

12. The information processing device according to claim 1, wherein the circuitry is further configured to
    recommend information related to the proposal to the user in a case where the user has performed predetermined input operation.

13. The information processing device according to claim 12,
    wherein the information related to the proposal includes at least one of content of the proposal, a number of times of occurrence of the acquisition timing, or a number of times of generation of the second program.

14. The information processing device according to claim 12,
    wherein, in a case where there are a plurality of proposals, the circuitry is further configured to
    recommend information related to each proposal of the plurality of proposals on the basis of at least one of a number of times of a corresponding acquisition timing or a number of times of activation of a piece of software related to a corresponding relevant element, among the plurality of proposals.

15. The information processing device according to claim 1,
wherein the input information includes at least one of input information from application software, input information from system software, voice of a user, an image related to behavior of the input information of the user input through equipment operated by the user, or operation of the equipment operated by the user.

16. The information processing device according to claim 1,
wherein the first program and the second program include programs related to pieces of software independent from each other.

17. The information processing device according to claim 1,
wherein the first program and the second program include programs related to an identical piece of software.

18. The information processing device according to claim 16,
wherein the software includes at least one of system software or application software.

19. An information processing method comprising:
acquiring input information of a user;
executing, by a processor at an acquisition timing of the input information and based on the input information, a first program recognized from the input information; and
proposing automation of control of execution of a second program executed automatically based on the input information, the second program obtained by performing, on the first program, at least one of addition of a first relevant element related to an input element included in the first program to the input element or replacement of the input element with a second relevant element related to the input element, a timing at which automation of control is proposed is based on the acquisition timing of the input information.

20. A non-transitory computer-readable medium having embodied thereon a program, which when executed by a computer causes the computer to execute an information processing method, the method comprising:
acquiring input information of a user;
executing, at an acquisition timing of the input information and based on the input information, a first program recognized from the input information; and
proposing automation of control of execution of a second program executed automatically based on the input information, the second program obtained by performing, on the first program, at least one of addition of a first relevant element related to an input element included in the first program to the input element or replacement of the input element with a second relevant element related to the input element, a timing at which automation of control is proposed is based on the acquisition timing of the input information.

21. The information processing device according to claim 1,
wherein the timing at which the automation of control is proposed is at the acquisition timing of the input information.

22. The information processing device according to claim 1, wherein the automation of control of the second program includes automatically executing the second program based on subsequent acquisition timings of the input information subsequent to the acquisition timing of the input information.

* * * * *